United States Patent [19]
McDowell et al.

[11] Patent Number: 6,026,792
[45] Date of Patent: Feb. 22, 2000

[54] METHOD OF OPERATING A FUEL INJECTED ENGINE

[75] Inventors: Philip D. McDowell, Sullivan, Wis.; Wolfram Hellmich, Munich, Germany; Todd D. Craft, Kenosha; Christopher R. Irgens, Elm Grove, both of Wis.; Wolfgang Heimberg, Ebersberg, Germany; Francis A. McGinnity, Eglinton, Ireland; Gregory J. Binversie, Grayslake, Ill.

[73] Assignee: Outboard Marine Corporation, Waukegan, Ill.

[21] Appl. No.: 08/879,526

[22] Filed: Jun. 20, 1997

[51] Int. Cl.[7] .......................................................... F02P 3/02
[52] U.S. Cl. .......................................... 123/620; 123/625
[58] Field of Search ..................................... 123/620, 625, 123/305, 500, 501

[56] References Cited

U.S. PATENT DOCUMENTS

| | | | |
|---|---|---|---|
| 3,900,015 | 8/1975 | Mainprize | 123/625 |
| 4,345,575 | 8/1982 | Jorgensen | 123/620 |
| 4,441,469 | 4/1984 | Wilke | 123/295 |
| 4,469,082 | 9/1984 | Nishitoba | 123/625 |
| 5,038,744 | 8/1991 | Martin | 123/625 |
| 5,078,107 | 1/1992 | Morikawa | 123/295 |
| 5,170,760 | 12/1992 | Yamada | 123/620 |
| 5,553,579 | 9/1996 | Yoshida et al. | 123/295 |
| 5,724,938 | 3/1998 | Yamada | 123/305 |

*Primary Examiner*—Carl S. Miller
*Attorney, Agent, or Firm*—Fletcher, Yoder & Van Someren

[57] ABSTRACT

A method of operating a two-stroke, spark-ignited, internal combustion engine in which the ignition is time-based controlled at low or idle speeds and is crank-angle-based controlled at higher speeds.

9 Claims, 14 Drawing Sheets

Fig. 11

INJECTION TIMING
(DEGREES BEFORE TOP-DEAD-CENTER ("DBTDC"))

THROTTLE POSITION (y1)

| y1/x1 | 200 | 400 | 500 | 600 | 700 | 800 | 900 | 1000 | 1100 | 1200 | 1300 | 1400 | 1500 | 2000 | 2500 | 3000 | 3500 | 4000 | 4500 | 5000 | 5500 | 7000 | |
|---|---|---|---|---|---|---|---|---|---|---|---|---|---|---|---|---|---|---|---|---|---|---|---|
| 0 | 21 | 15 | 10 | 9 | 7 | 6 | 5 | 5 | 5 | 5 | 5 | 5 | 5 | 5 | 5 | 5 | 5 | 5 | 5 | 5 | 5 | 5 | Represents moment. in DBTDC, when current begins to flow in injector coil. |
| 50 | 30 | 30 | 30 | 30 | 30 | 30 | 31 | 35 | 40 | 40 | 40 | 40 | 40 | 40 | 40 | 40 | 40 | 40 | 40 | 40 | 40 | 40 | |
| 100 | 70 | 70 | 70 | 70 | 70 | 70 | 70 | 70 | 70 | 70 | 75 | 75 | 75 | 95 | 95 | 95 | 95 | 95 | 95 | 95 | 95 | 95 | |
| 150 | 60 | 60 | 60 | 60 | 60 | 60 | 65 | 70 | 80 | 85 | 85 | 90 | 90 | 95 | 95 | 95 | 95 | 95 | 95 | 95 | 95 | 95 | |
| 151 | 155 | 155 | 155 | 155 | 155 | 155 | 155 | 155 | 150 | 145 | 140 | 140 | 140 | 150 | 160 | 160 | 160 | 160 | 160 | 160 | 160 | 160 | Represents moment. in DBTDC, when fuel spray from injector into combustion chamber begins |
| 200 | 210 | 210 | 210 | 210 | 210 | 215 | 210 | 200 | 185 | 205 | 200 | 195 | 195 | 195 | 200 | 205 | 205 | 210 | 205 | 205 | 205 | 205 | |
| 300 | 205 | 205 | 205 | 215 | 215 | 215 | 210 | 205 | 185 | 190 | 195 | 185 | 185 | 200 | 195 | 205 | 205 | 210 | 215 | 215 | 215 | 215 | |
| 400 | 205 | 205 | 205 | 215 | 215 | 213 | 210 | 205 | 190 | 205 | 195 | 195 | 195 | 205 | 205 | 205 | 215 | 220 | 220 | 220 | 215 | 215 | |
| 500 | 210 | 210 | 210 | 215 | 215 | 213 | 210 | 210 | 195 | 195 | 200 | 200 | 200 | 205 | 205 | 205 | 215 | 215 | 220 | 220 | 215 | 215 | |
| 600 | 210 | 210 | 210 | 215 | 215 | 213 | 210 | 210 | 195 | 205 | 190 | 195 | 190 | 205 | 205 | 205 | 215 | 220 | 220 | 220 | 215 | 215 | |
| 700 | 210 | 210 | 210 | 215 | 215 | 215 | 210 | 210 | 210 | 205 | 210 | 210 | 205 | 210 | 210 | 205 | 215 | 215 | 220 | 220 | 215 | 215 | |
| 800 | 210 | 210 | 210 | 215 | 220 | 220 | 210 | 210 | 205 | 205 | 210 | 210 | 205 | 210 | 210 | 205 | 215 | 215 | 220 | 220 | 215 | 215 | |
| 1000 | 210 | 210 | 210 | 215 | 215 | 215 | 210 | 210 | 205 | 205 | 210 | 210 | 205 | 210 | 210 | 205 | 215 | 215 | 220 | 220 | 215 | 215 | |

Fig. 12.
IGNITION TIMING

| y1/x1 | 200 | 400 | 500 | 600 | 700 | 800 | 900 | 1000 | 1100 | 1200 | 1300 | 1400 | 1500 | 2000 | 2500 | 3000 | 3500 | 4000 | 4500 | 5000 | 5500 | 7000 | UNITS |
|---|---|---|---|---|---|---|---|---|---|---|---|---|---|---|---|---|---|---|---|---|---|---|---|
| 0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | (ms) |
| 50 | 1.5 | 1.5 | 1.5 | 1.5 | 1.5 | 1.5 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | (ms) |
| 100 | 3.0 | 3.0 | 3.0 | 3.0 | 3.0 | 2.5 | 2.0 | 2.0 | 1.5 | 1.5 | 1.5 | 1.5 | 1.5 | 1.5 | 1.5 | 1.5 | 1.5 | 1.5 | 1.5 | 1.5 | 1.5 | 1.5 | (ms) |
| 150 | 4.0 | 4.0 | 4.0 | 4.0 | 4.0 | 3.5 | 3.0 | 2.0 | 1.5 | 1.5 | 1.5 | 2.5 | 1.5 | 1.5 | 1.5 | 1.5 | 1.5 | 1.5 | 1.5 | 1.5 | 1.5 | 1.5 | (ms) |
| 151 | 0.0 | 0.0 | 0.0 | 0.0 | 0.0 | 0.0 | 0.0 | 0.0 | 0.0 | 0.0 | 0.0 | 0.0 | 0.0 | -1.0 | -2.0 | -2.0 | -2.0 | -2.0 | -2.0 | -2.0 | -2.0 | -2.0 | Deg. BTDC |
| 200 | 4.0 | 4.0 | 4.0 | 4.0 | 6.0 | 8.0 | 10.0 | 18.0 | 15.0 | 14.0 | 20.0 | 18.0 | 20.0 | 20.0 | 20.0 | 20.0 | 20.0 | 20.0 | 18.0 | 18.0 | 18.0 | 18.0 | Deg. BTDC |
| 300 | 4.0 | 4.0 | 4.0 | 4.0 | 6.0 | 8.0 | 10.0 | 16.0 | 16.0 | 16.0 | 17.0 | 20.1 | 18.3 | 20.0 | 20.0 | 18.0 | 20.0 | 20.0 | 18.0 | 30.0 | 24.0 | 24.0 | Deg. BTDC |
| 400 | 4.0 | 4.0 | 4.0 | 4.0 | 6.0 | 8.0 | 10.0 | 16.0 | 16.0 | 14.0 | 17.0 | 17.0 | 18.0 | 18.0 | 18.0 | 18.0 | 18.0 | 20.0 | 22.0 | 26.0 | 28.0 | 28.0 | Deg. BTDC |
| 500 | 4.0 | 4.0 | 4.0 | 4.0 | 6.0 | 8.0 | 9.0 | 14.0 | 16.0 | 16.0 | 17.0 | 17.1 | 17.0 | 18.0 | 18.1 | 18.0 | 18.0 | 18.0 | 18.0 | 26.0 | 28.0 | 28.0 | Deg. BTDC |
| 600 | 4.0 | 4.0 | 4.0 | 4.0 | 6.0 | 7.0 | 1.0 | 14.0 | 16.0 | 14.0 | 15.0 | 17.1 | 18.0 | 10.0 | 18.1 | 18.0 | 18.0 | 20.0 | 22.0 | 24.0 | 10.0 | 30.0 | Deg. BTDC |
| 700 | 4.0 | 4.0 | 4.0 | 4.0 | 6.0 | 6.5 | 7.0 | 12.0 | 14.0 | 14.0 | 14.0 | 16.0 | 16.0 | 16.0 | 16.0 | 18.0 | 18.0 | 18.0 | 20.0 | 26.0 | 28.0 | 28.0 | Deg. BTDC |
| 800 | 6.0 | 4.0 | 4.0 | 4.0 | 6.0 | 6.5 | 7.0 | 12.0 | 14.0 | 14.0 | 14.0 | 16.0 | 16.0 | 16.0 | 16.0 | 18.0 | 18.0 | 18.0 | 20.0 | 26.0 | 28.0 | 28.0 | Deg. BTDC |
| 1000 | 6.0 | 4.0 | 4.0 | 4.0 | 6.0 | 6.0 | 7.0 | 12.0 | 14.0 | 14.0 | 14.0 | 16.0 | 16.0 | 16.0 | 16.0 | 18.0 | 18.0 | 18.0 | 20.0 | 26.0 | 28.0 | 28.0 | Deg. BTDC |

THROTTLE POSITION

| RPM | IGNITION ON TIME |
|---|---|
| 1000 | 5.0msec. |
| 1500 | 5.0msec. |
| 2000 | 3.5msec. |
| 2500 | 2.5msec. |
| 3000 | 2.0msec. |
| 3500 | 1.5msec. |
| 4000 | 1.0msec. |
| 4500 | 1.0msec. |
| 5000 | .8msec. |
| 5500 | .7msec. |
| 6000 | .6msec. |

IGNITION-COIL-ON-TIME (ms)

| y1/x1 | 200 | 400 | 500 | 600 | 700 | 800 | 900 | 1000 | 1100 | 1200 | 1300 | 1400 | 1500 | 2000 | 2500 | 3000 | 3500 | 4000 | 4500 | 5000 | 5500 | 7000 |
|---|---|---|---|---|---|---|---|---|---|---|---|---|---|---|---|---|---|---|---|---|---|---|
| 0 | 5.0 | 5.0 | 4.0 | 3.0 | 3.0 | 3.0 | 3.0 | 3.0 | 3.0 | 3.0 | 3.0 | 3.0 | 3.0 | 3.0 | 2.5 | 2.0 | 1.5 | 1.0 | 1.0 | 0.8 | 0.7 | 0.5 |
| 50 | 5.0 | 5.0 | 5.0 | 5.0 | 3.0 | 3.0 | 3.0 | 3.0 | 5.0 | 5.0 | 3.0 | 3.0 | 3.0 | 3.0 | 2.5 | 2.0 | 1.5 | 1.0 | 1.0 | 0.8 | 0.7 | 0.5 |
| 100 | 5.0 | 5.0 | 5.0 | 5.0 | 3.0 | 3.0 | 3.0 | 3.0 | 5.0 | 5.0 | 5.0 | 5.0 | 3.0 | 3.0 | 2.5 | 2.0 | 1.5 | 1.0 | 1.0 | 0.8 | 0.7 | 0.5 |
| 150 | 5.0 | 5.0 | 5.0 | 5.0 | 3.0 | 3.0 | 3.0 | 3.0 | 5.0 | 4.0 | 5.0 | 5.0 | 5.0 | 3.0 | 2.5 | 2.0 | 1.5 | 1.0 | 1.0 | 0.8 | 0.7 | 0.5 |
| 151 | 3.0 | 3.0 | 3.0 | 2.8 | 0.6 | 0.5 | 0.6 | 0.6 | 0.6 | 0.6 | 0.6 | 0.6 | 0.6 | 0.6 | 0.6 | 0.6 | 0.6 | 0.6 | 0.6 | 0.6 | 0.7 | 0.5 |
| 200 | 0.5 | 0.5 | 0.5 | 0.5 | 0.5 | 0.5 | 0.1 | 0.5 | 0.5 | 0.5 | 0.5 | 0.5 | 0.5 | 0.5 | 0.5 | 0.5 | 0.6 | 0.6 | 0.6 | 0.6 | 0.6 | 0.5 |
| 300 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.6 | 0.6 | 0.6 | 0.6 | 0.6 | 0.5 |
| 400 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.6 | 0.6 | 0.6 | 0.6 | 0.6 | 0.5 |
| 500 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.6 | 0.6 | 0.6 | 0.6 | 0.6 | 0.5 |
| 600 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.6 | 0.6 | 0.6 | 0.6 | 0.6 | 0.5 |
| 700 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.6 | 0.6 | 0.6 | 0.6 | 0.6 | 0.5 |
| 800 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.6 | 0.6 | 0.6 | 0.6 | 0.6 | 0.5 |
| 1000 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.6 | 0.6 | 0.6 | 0.6 | 0.6 | 0.5 |

THROTTLE POS.

Fig. 15

INJECTION PULSE TIME (ms)

| y1/x1 | 0 | 200 | 400 | 500 | 600 | 700 | 800 | 900 | 1000 | 1100 | 1200 | 1300 | 1400 | 1500 | 2000 | 2500 | 3000 | 3500 | 4000 | 4500 | 5000 | 5500 | 7000 |
|---|---|---|---|---|---|---|---|---|---|---|---|---|---|---|---|---|---|---|---|---|---|---|---|
| 0 | 6.000 | 4.848 | 4.818 | 4.619 | 4.579 | 4.400 | 4.299 | 4.299 | 4.299 | 4.300 | 4.300 | 4.300 | 4.300 | 4.299 | 4.299 | 4.299 | 4.299 | 4.299 | 4.290 | 4.299 | 4.299 | 4.290 | 4.299 |
| 50 | 4.818 | 4.818 | 4.848 | 4.818 | 4.719 | 4.419 | 4.449 | 4.450 | 4.479 | 4.499 | 4.519 | 4.519 | 4.519 | 4.519 | 4.519 | 4.519 | 4.519 | 4.519 | 4.519 | 4.519 | 4.519 | 4.519 | 4.519 |
| 100 | 4.848 | 4.848 | 4.848 | 4.848 | 4.848 | 4.748 | 4.400 | 4.320 | 4.270 | 4.250 | 4.250 | 4.220 | 4.220 | 4.250 | 4.230 | 4.230 | 4.230 | 4.230 | 4.230 | 4.230 | 4.230 | 4.230 | 4.230 |
| 150 | 4.000 | 4.830 | 4.830 | 4.830 | 4.830 | 4.830 | 4.760 | 4.739 | 4.649 | 4.569 | 4.499 | 4.339 | 4.400 | 4.319 | 4.480 | 4.480 | 4.480 | 4.480 | 4.480 | 4.480 | 4.480 | 4.480 | 4.480 |
| 151 | 4.830 | 4.800 | 4.800 | 4.860 | 5.099 | 5.080 | 5.009 | 5.049 | 5.080 | 5.100 | 5.080 | 4.880 | 4.840 | 4.840 | 4.789 | 4.789 | 4.680 | 4.630 | 4.420 | 4.340 | 4.250 | 4.140 | 4.700 |
| 200 | 4.800 | 5.200 | 5.200 | 5.250 | 5.180 | 5.149 | 5.190 | 5.149 | 5.090 | 5.090 | 4.999 | 4.949 | 4.899 | 4.899 | 4.899 | 4.899 | 4.749 | 4.649 | 4.449 | 4.399 | 4.360 | 4.200 | 4.700 |
| 300 | 5.000 | 5.199 | 5.199 | 5.349 | 5.249 | 5.190 | 5.299 | 5.249 | 5.149 | 5.240 | 5.199 | 5.190 | 5.099 | 5.099 | 5.149 | 5.199 | 5.190 | 4.949 | 4.749 | 4.649 | 4.549 | 4.349 | 4.500 |
| 400 | 5.199 | 5.290 | 5.299 | 5.490 | 5.399 | 5.329 | 5.449 | 5.399 | 5.300 | 5.399 | 5.299 | 5.299 | 5.399 | 5.549 | 5.649 | 5.649 | 5.649 | 5.399 | 5.299 | 5.049 | 4.849 | 4.700 | 4.749 |
| 500 | 5.290 | 5.500 | 5.999 | 5.549 | 5.449 | 5.379 | 5.549 | 5.499 | 5.490 | 5.550 | 5.550 | 5.449 | 5.499 | 5.599 | 5.799 | 6.049 | 6.199 | 5.890 | 5.790 | 5.549 | 5.349 | 5.150 | 5.049 |
| 600 | 5.500 | 5.600 | 6.050 | 5.600 | 5.500 | 5.429 | 5.600 | 5.549 | 5.550 | 5.550 | 5.550 | 5.550 | 5.550 | 5.700 | 5.850 | 6.100 | 6.349 | 6.099 | 6.000 | 5.549 | 5.450 | 5.150 | 5.200 |
| 700 | 5.500 | 5.600 | 6.050 | 5.650 | 5.500 | 5.429 | 5.600 | 5.550 | 5.550 | 5.550 | 5.550 | 5.550 | 5.550 | 5.700 | 5.850 | 6.100 | 6.349 | 6.099 | 6.000 | 5.749 | 5.450 | 5.150 | 5.149 |
| 800 | 5.600 | 5.500 | 6.050 | 5.650 | 5.500 | 5.429 | 5.600 | 5.550 | 5.550 | 5.550 | 5.550 | 5.550 | 5.550 | 5.700 | 5.850 | 6.100 | 6.349 | 6.099 | 6.000 | 5.749 | 5.450 | 5.150 | 5.149 |
| 1000 | 5.600 | 5.500 | 6.050 | 5.650 | 5.500 | 5.430 | 5.600 | 5.549 | 5.550 | 5.549 | 5.549 | 5.550 | 5.549 | 5.700 | 5.800 | 6.100 | 6.350 | 6.099 | 6.000 | 5.750 | 5.450 | 5.150 | 5.149 |

THROTTLE POS.

METHOD OF OPERATING A FUEL INJECTED ENGINE

CROSS-REFERENCES TO RELATED APPLICATIONS

Attention is directed to the following related applications, which are incorporated herein by reference:

Application Ser. No. 08/507,664, filed Jul. 25, 1995;

Application entitled "Improved Time Delay Ignition Circuit for an Internal Combustion Engine", Ser. No. 60/020,032, filed Jun. 21, 1996;

Application entitled "Multiple Spark Capacitive Discharge Ignition System for an Internal Combustion Engine", Ser. No. 60/020,033, filed Jun. 21, 1996; and This application which claims the filing date of provisional application Ser. No. 60/020,490, filed Jun. 21, 1996.

BACKGROUND OF THE INVENTION

The invention relates to methods of operating fuel-injected internal combustion engines and, more particularly, to methods of operating fuel-injected two-stroke engines. Still more particularly, the invention relates to marine propulsion devices which employ such methods.

SUMMARY OF THE INVENTION

The invention provides a method of operating a two-stroke, spark-ignited, internal combustion engine including a cylinder defining a combustion chamber and having therein a piston moveable between a top-dead-center position and a bottom-dead-center position, and a single, solenoid-operated, combined fuel pump and nozzle assembly communicating with the combustion chamber, which method comprises the steps of supplying air essentially unmixed with fuel to the combustion chamber for pressurization incident to piston advance toward top-dead-center position, supplying liquid fuel under low pressure and essentially unmixed with air to the combined fuel pump and nozzle assembly, operating the combined fuel pump and nozzle assembly, during low engine speed, to deliver fuel essentially unmixed with air directly into the combustion chamber at a pressure substantially above the low fuel pressure and higher than the air pressure in the combustion chamber occurring in response to air pressurization incident to piston advance toward top-dead-center, so as thereby to obtain a finely atomized stratified charge in the combustion chamber, igniting the fuel, during low engine speed, at a given spark energy level and at a first timing spaced before top-dead-center position, operating the combined fuel pump and nozzle assembly, during high engine speed, to deliver fuel essentially unmixed with air directly into the combustion chamber at a pressure substantially above the low fuel pressure and higher than the air pressure in the combustion chamber occurring in response to air pressurization incident to piston advance toward top-dead-center, so as thereby to obtain a homogeneous charge in the combustion chamber, and igniting the fuel, during high engine speed, at a given spark energy level less than the given spark energy level and at a second timing spaced before top-dead-center position at a greater spacing than the first timing.

The invention also provides a method of operating a two-stroke, spark-ignited, internal combustion engine including a cylinder defining a combustion chamber and having therein a piston moveable between a top-dead-center position and a bottom-dead-center position, and a single, solenoid-operated, combined fuel pump and nozzle assembly communicating with the combustion chamber, which method comprises the steps of supplying air essentially unmixed with fuel to the combustion chamber for pressurization incident to piston advance toward top-dead-center position, supplying liquid fuel under low pressure and essentially unmixed with air to the combined fuel pump and nozzle assembly, operating the combined fuel pump and nozzle assembly, during low engine speed, to deliver fuel essentially unmixed with air directly into the combustion chamber at a pressure substantially above the low fuel pressure and higher than the air pressure in the combustion chamber occurring in response to air pressurization incident to piston advance toward top-dead-center, so as thereby to obtain a finely atomized stratified charge in the combustion chamber, igniting the fuel, during low engine speed, at a given spark energy level and at a timing based on a time interval after fuel injection, operating the combined fuel pump and nozzle assembly, during high engine speed, to deliver fuel essentially unmixed with air directly into the combustion chamber at a pressure substantially above the low fuel pressure and higher than the air pressure in the combustion chamber occurring in response to air pressurization incident to piston advance toward top-dead-center, so as thereby to obtain a homogeneous charge in the combustion chamber, and igniting the fuel, during high engine speed, at a lesser spark energy level than the given spark energy level and at a timing based on crank angle.

The invention also provides a method of operating a two-stroke, spark-ignited, internal combustion engine including a cylinder defining a combustion chamber and having therein a piston moveable between a top-dead-center position and a bottom-dead-center position, and a single, solenoid-operated, combined fuel pump and nozzle assembly communicating with the combustion chamber, which method comprises the steps of supplying air essentially unmixed with fuel to the combustion chamber for pressurization incident to piston advance toward top-dead-center position, supplying liquid fuel under low pressure and essentially unmixed with air to the combined fuel pump and nozzle assembly, operating the combined fuel pump and nozzle assembly, when the engine throttle is set at or below about 15 percent open, to deliver fuel essentially unmixed with air directly into the combustion chamber at a pressure substantially above the low fuel pressure and higher than the air pressure in the combustion chamber occurring in response to air pressure incident to piston advance toward top-dead-center, so as thereby to obtain a finely atomized stratified charge in the combustion chamber, igniting the fuel, when the engine throttle is set at or below about 15 percent open, at a given spark energy level and at a timing based on a time interval after fuel injection, operating the combined fuel pump and nozzle assembly, when the engine throttle is set above about 15 percent open, to deliver fuel essentially unmixed with air directly into the combustion chamber at a pressure substantially above the low fuel pressure and higher than the pressure in the combustion chamber occurring in response to air pressurization incident to piston advance toward top-dead-center, so as thereby to obtain a homogeneous charge in the combustion chamber, and igniting the fuel, when the engine throttle is set above about 15 percent open, at a lesser spark energy level than the given spark energy level, and at a timing based on the crank angle.

The invention also provides a method of operating a two-stroke, spark-ignited, internal combustion engine including a cylinder defining a combustion chamber and having therein a piston moveable between a top-dead-center position and a bottom-dead-center position, and a single, solenoid-operated, combined fuel pump and nozzle assembly communicating with the combustion chamber, which method comprises the steps of supplying air essentially unmixed with fuel to the combustion chamber for pressurization incident to piston advance toward top-dead-center position, supplying liquid fuel under low pressure and essentially unmixed with air to the combined fuel pump and nozzle assembly, operating the combined fuel pump and nozzle assembly, when the engine throttle is set at or below about 15 percent open, to deliver fuel essentially unmixed with air directly into the combustion chamber at a pressure substantially above the low fuel pressure and higher than the air pressure in the combustion chamber occurring in response to air pressurization incident to piston advance toward top-dead-center, so as thereby to obtain a finely atomized stratified charge in the combustion chamber, igniting the fuel when the engine throttle is set at or below about 15 percent open, at a given spark energy level less than the given spark energy level and at a timing based on a time interval after fuel injection, operating the combined fuel pump and nozzle assembly, when the engine throttle is set between about 15 percent open and 100 percent open, to deliver fuel essentially unmixed with air directly into the combustion chamber at a pressure substantially above the low fuel pressure and higher than the air pressure in the combustion chamber occurring in response to air pressurization incident to piston advance toward top-dead-center, so as thereby to obtain a homogeneous charge in the combustion chamber, and igniting the fuel, when the engine throttle is set between about 15 percent open and 100 percent open, at a first spark energy level, and at a timing based on the crank angle.

The invention also provides an internal combustion engine operating method comprising the steps of obtaining a two-stroke, spark-ignited, internal combustion engine including a cylinder defining a combustion chamber and having therein a piston moveable between a top-dead-center position and a bottom-dead-center position, which engine also includes a single, solenoid-operated, combined fuel pump and nozzle assembly communicating with the combustion chamber, supplying air essentially unmixed with fuel to the combustion chamber for pressurization incident to piston advance toward top-dead-center position, supplying liquid fuel under low pressure and essentially unmixed with air to the combined fuel pump and nozzle assembly, operating the combined fuel pump and nozzle assembly, during wide-open throttle condition and at maximum engine speed, to deliver fuel essentially unmixed with air directly into the combustion chamber at a pressure substantially above the low fuel pressure and higher than the air pressure in the combustion chamber occurring in response to air pressurization incident to piston advance toward top-dead-center, and at a small angle to the direction of the cylinder axis commencing when the piston is spaced before top-dead-center position by about 215 degrees and continuing until the piston is spaced before top-dead-center position by about 130 degrees so as thereby to obtain, throughout the combustion chamber, a homogeneous charge of fuel droplets having a relatively large size, igniting the fuel, during wide-open throttle condition and at maximum engine speed, with one to three spark occurrences commencing when the piston is spaced before top-dead-center position by about 28 degrees and continuing until the piston is spaced before top-dead-center position by about 7 degrees, operating the combined fuel pump and nozzle assembly, during 15 percent open throttle condition and at an engine speed of about 200 RPM, to inject fuel essentially unmixed with air directly into the combustion chamber at a pressure substantially above the low fuel pressure and higher than the air pressure in the combustion chamber occurring in response to air pressurization incident to piston advance toward top-dead-center, and at a small angle to the direction of the cylinder axis commencing when the piston is spaced before top-dead-center position by about 56.4 degrees and continuing until the piston is spaced before top-dead-center position by about 14 degrees so as thereby to obtain, near the top of the combustion chamber, a stratified charge of finely atomized fuel droplets having a size less than the large size fuel droplets of the homogeneous charge, and igniting the fuel, during 15 percent open throttle condition and at an engine speed of about 200 RPM with about ten to fifteen spark occurrences commencing when the piston is spaced before top-dead-center position by about 51.9 degrees and continuing until the piston is spaced before top-dead-center position by about 14 degrees.

Other features and advantages of the invention will become apparent to those skilled in the art upon review of the following detailed description and drawings.

BRIEF DESCRIPTION OF THE DRAWINGS

These and other features of the present invention will be more fully disclosed when taken in conjunction with the following DETAILED DESCRIPTION OF THE PREFERRED EMBODIMENT in which like numerals represent like elements and in which:

FIG. 11 is a chart illustrating injection timing for the engine of FIG. 10 as measured in degrees before top-dead-center (DBTDC) and plotted as a function of engine speed and throttle position;

FIG. 12 is a chart illustrating ignition timing for the engine of FIG. 10 as measured in DBTDC and plotted as a function of engine speed and throttle position;

FIG. 13 is a chart which plots ignition coil on time as a function of engine speed and throttle position;

FIG. 14 is a chart illustrating the ignition coil on time for the engine of FIG. 10 as measured in milliseconds (ms) and plotted as a finction of engine speed and throttle position;

FIG. 15 is a chart illustrating the injection pulse time for the engine of FIG. 10 as measured in milliseconds (ms) and plotted as a function of engine speed and throttle position.

Figure 2:
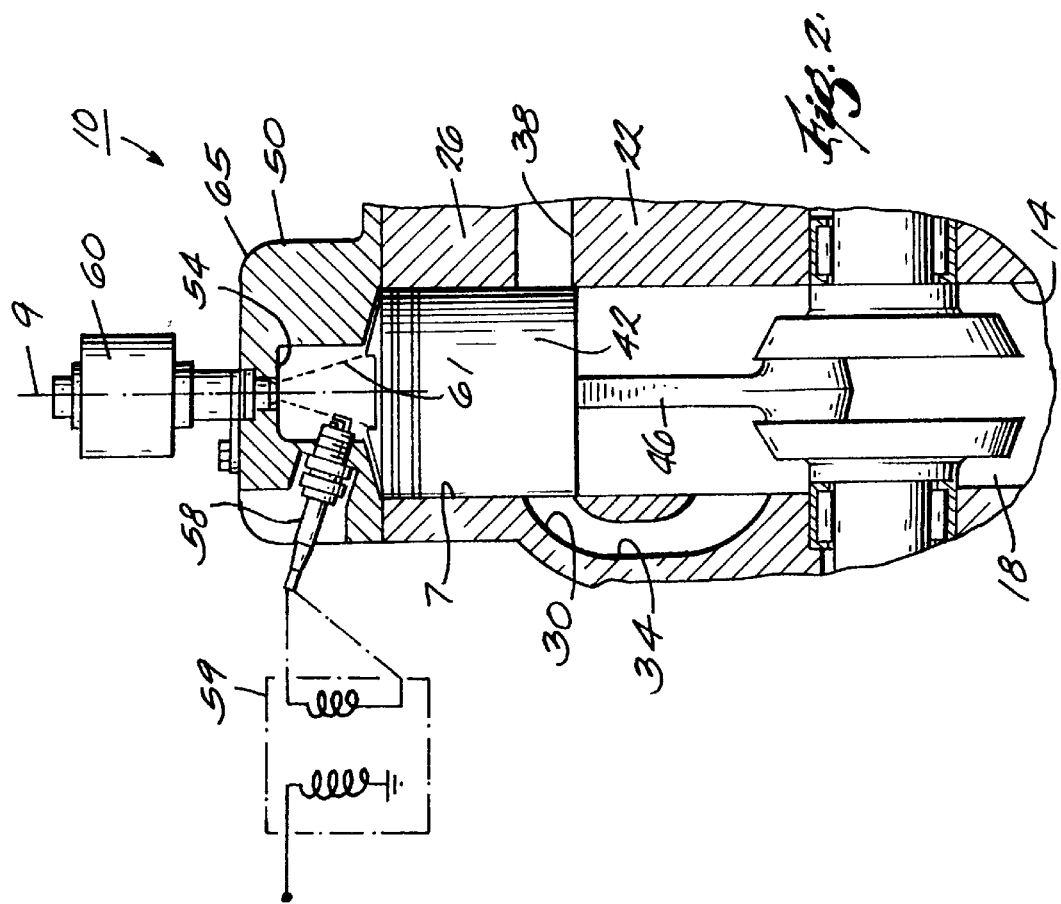
FIG. 2 is a partial cross section of an internal combustion engine embodying the engine.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DETAILED DESCRIPTION OF THE PREFERRED EMBODIMENT

Figure 1:
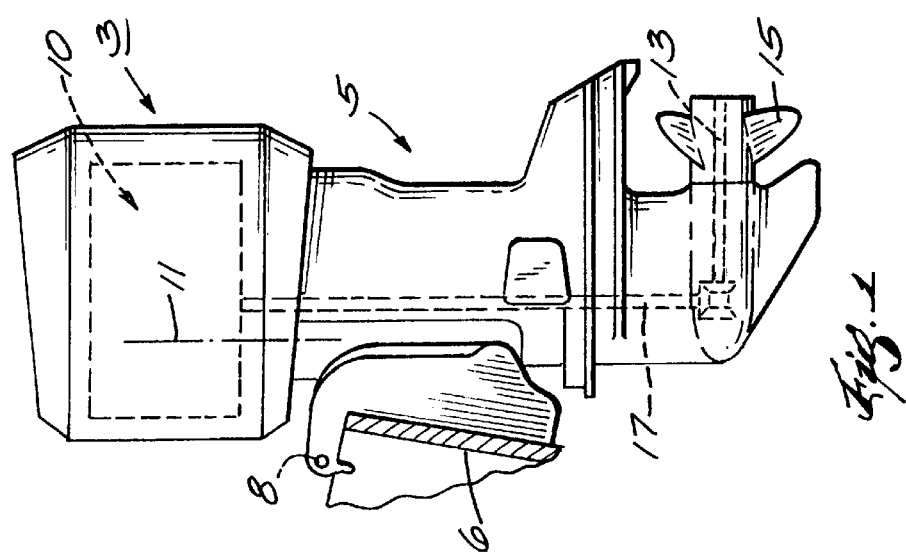
FIG. 1 is a side elevational view of a marine propulsion device embodying the invention.

A marine propulsion device embodying the invention is shown in FIG. 1 and includes an outboard drive or propulsion unit 5 adapted to be mounted on the transom 6 of a boat for pivotal tilting movement relative thereto about a generally horizontal tilt axis 8 and for pivotal steering movement relative thereto about a generally vertical steering axis 11. The drive or propulsion unit 5 includes a propeller shaft 13 having fixed thereon a propeller 15. The drive or propulsion unit 5 also includes a fuel-injected, two-stroke internal combustion engine 10 drivingly connected to the propeller shaft 13 by a conventional drive train 17. In the preferred embodiment of the invention, the engine 10 is a six-cylinder V-type engine. It should be understood, however, that the invention is applicable to other types of engines with any number of cylinders.

The internal combustion engine 10 is partially shown in greater detail in FIG. 2. Although any internal combustion engine is appropriate, the internal combustion engine 10 of the preferred embodiment is a two-stroke, direct-injected, internal combustion engine having six cylinders (illustrated schematically and labelled 1–6 in FIG. 7). A typical one of the cylinders of the engine 10 is illustrated in detail in FIG. 2.

More specifically, the engine 10 includes a crankcase 14 defining a crankcase chamber 18 and having a crankshaft 22 rotatable therein. An engine block 26 defines a plurality of cylinders 7 (one shown), each with an axis 9. The engine block 26 also defines an intake port 30 communicating between the cylinder 7 and the crankcase chamber 18 via a transfer passage 34. The engine block 26 also defines an exhaust port 38. A piston 42 is reciprocally moveable in the cylinder 1 between top-dead-center and bottom-dead-center positions and is drivingly connected to the crankshaft 22 by a crank pin 46. A cylinder head 50 closes the upper end of the cylinder 7 so as to define a combustion chamber 54. A spark plug 58 is mounted on the cylinder head 50 and extends into the combustion chamber 54.

The engine 10 also includes a fuel injector 60 mounted on the cylinder head 50 for injecting fuel into the upper end of the combustion chamber 54. The preferred fuel injector 60 is a solenoid-operated, combined fuel injector and nozzle assembly which is disclosed in U.S. application Ser. No. 08/506,534, which was filed Jul. 25, 1995, which is entitled "Combined Pressure Surge Fuel Pump and Nozzle Assembly", and which is incorporated herein by reference.

The fuel injector 60 sprays fuel, essentially unmixed with air, into the combustion chamber 54 and creates a cone 61 of fuel spray surrounded by a volume of fuel vapor, the cone 61 being centered on the cylinder axis 9. Preferably, substantially the entirety of the fuel spray cone 61 strikes the piston 42 before striking any other surface. The fuel spray cone 61 has an outside defining a line 65 in a plane including the cylinder or cone axis 9 (the plane of the paper), the line 65 and the cylinder or cone axis 9 forming an acute angle which, in the illustrated and preferred construction, is approximately 15°.

The engine 38 also includes a source of fuel, i.e., a fuel tank (not shown), and a fuel supply system (not shown) for supplying fuel, essentially unmixed with air, to the various fuel injectors 60 of the engine 10. The fuel supply system includes a fuel pump (not shown) communicating between the fuel tank and the fuel injectors 60 for supplying fuel, unmixed with air, at a relatively low pressure to the fuel injectors 60. If desired, the liquid fuel, essentially unmixed with air, can contain less than about one percent of lubricating oil. The preferred fuel supply system is disclosed in U.S. application Ser. No. 08/507,135, which was filed Jul. 25, 1995, which is titled "Combined Fuel and Oil Pump for Internal Combustion Engine", and which is incorporated herein by reference.

Figure 3:
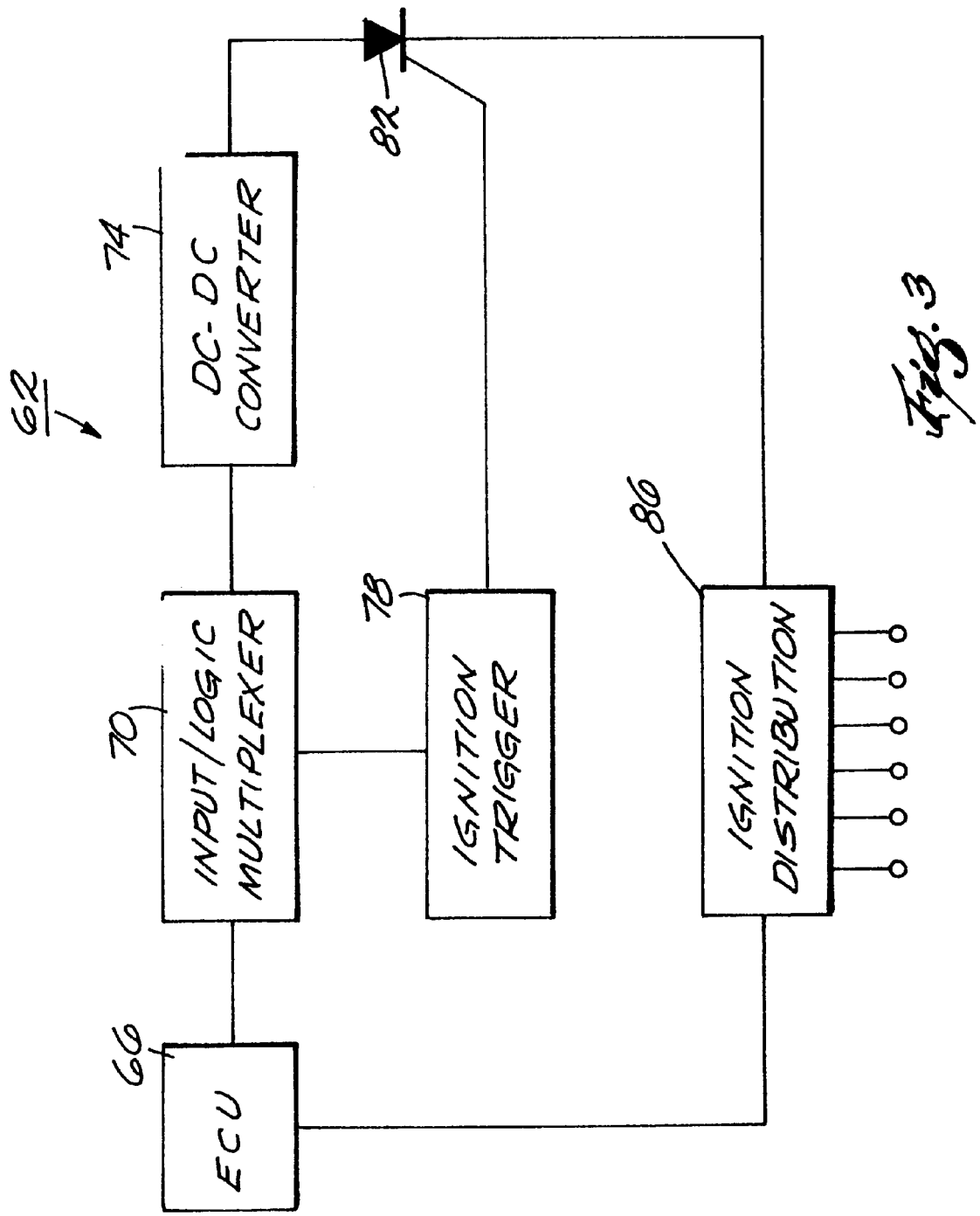
FIG. 3 is a block diagram of the ignition system for the internal combustion engine.

The internal combustion engine 10 also includes, as shown schematically in FIG. 3 of the drawings, an ignition system 62 for providing an ignition spark to the spark plug 58 to ignite fuel in the cylinders 1–6. The ignition system 62 illustrated in FIG. 3 may be used in an internal combustion engine having any number of cylinders. In the preferred embodiment of the invention, the ignition system 62 generates a plurality of ignition sparks (per cylinder, per cycle) when the fuel charge injected into the cylinder is stratified, and generates fewer sparks (per cylinder, per cycle) when the fuel charge injected into the cylinder is homogeneous.

Figure 4:
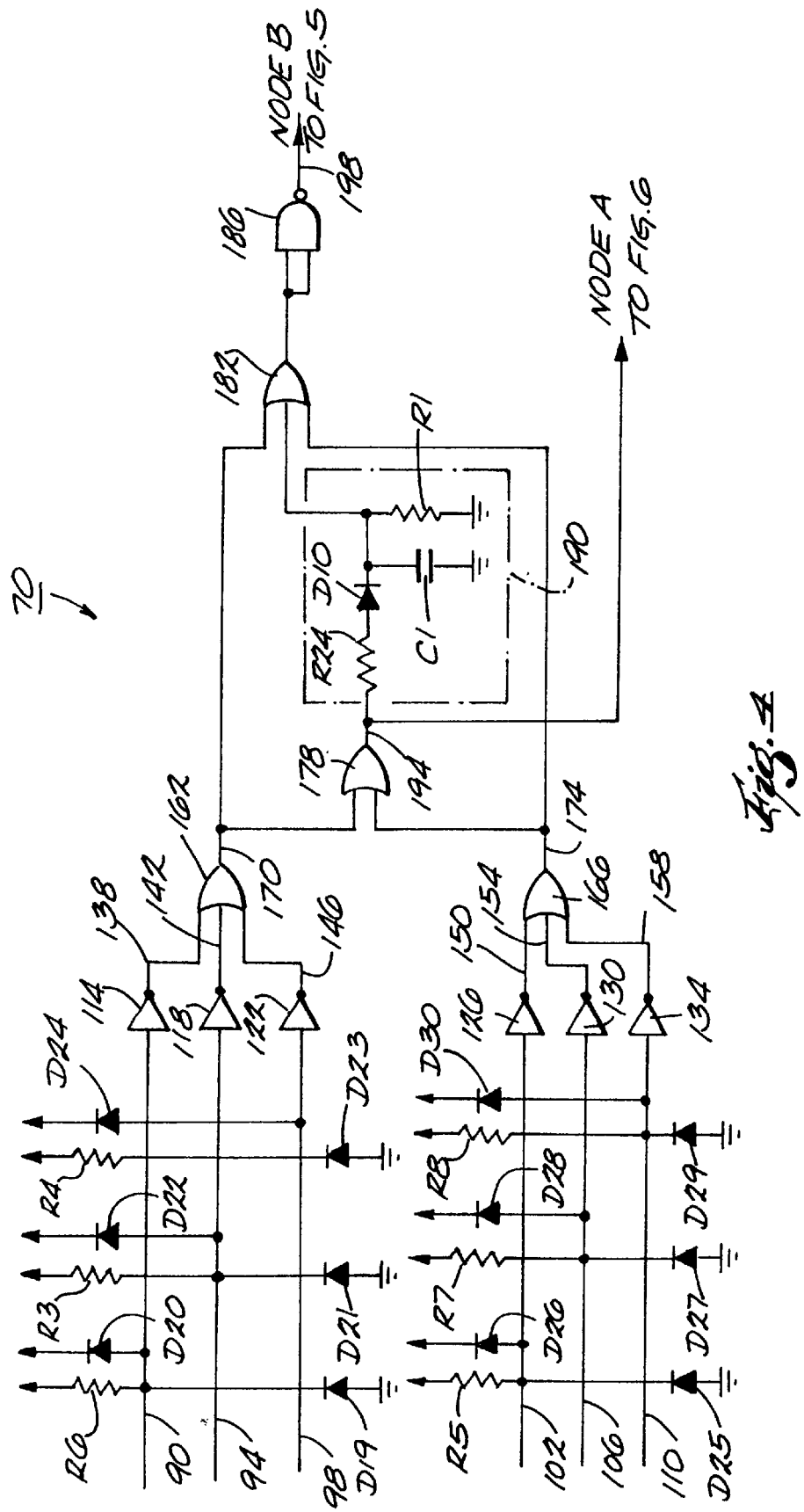
FIG. 4 is a detailed schematic of the input/logic multiplexer of the ignition system.
Figure 5:
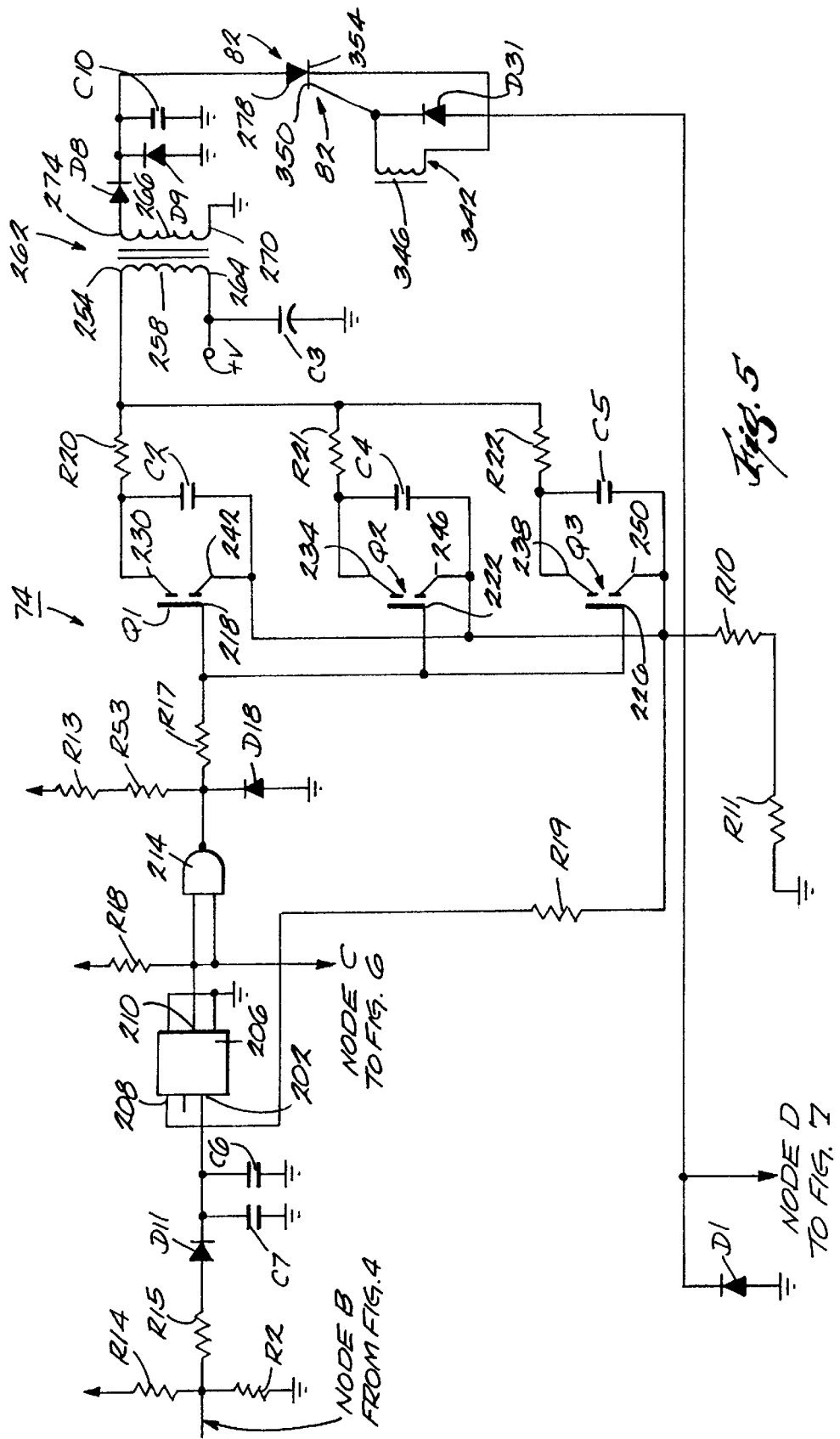
FIG. 5 is a detailed schematic of the DC—DC converter of the ignition system.
Figure 6:
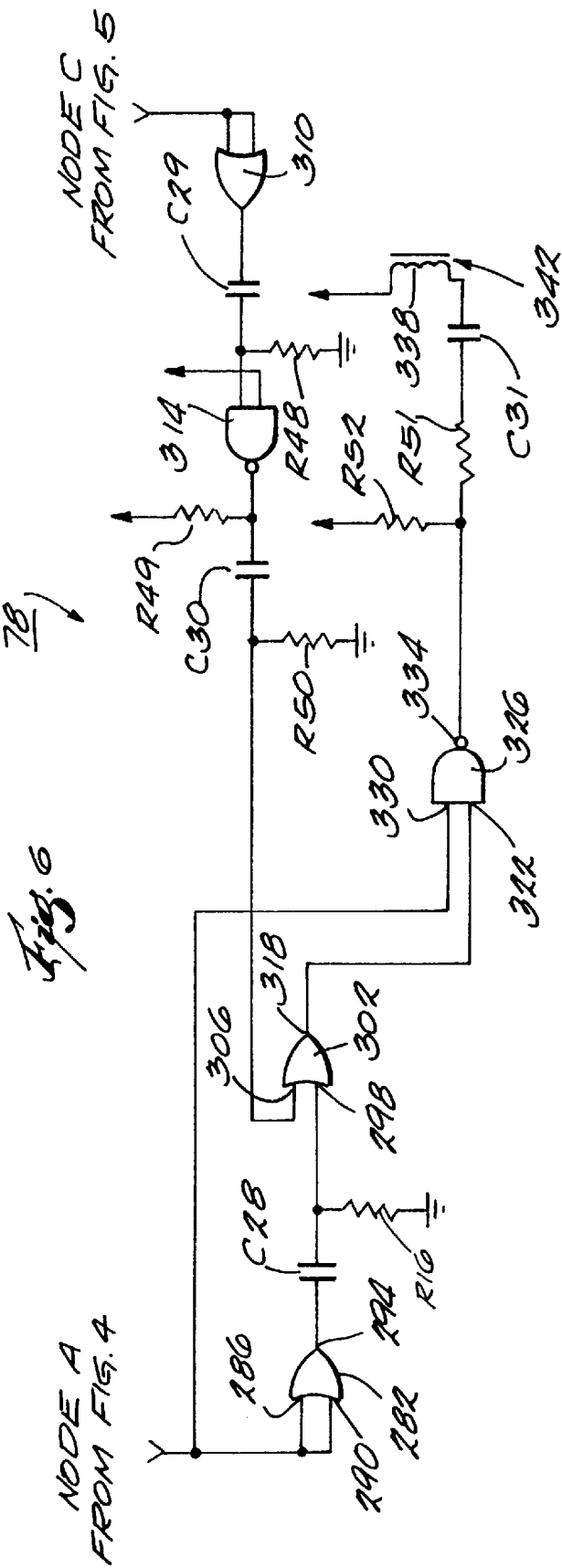
FIG. 6 is a detailed schematic of the ignition trigger circuit of the ignition system.
Figure 7:
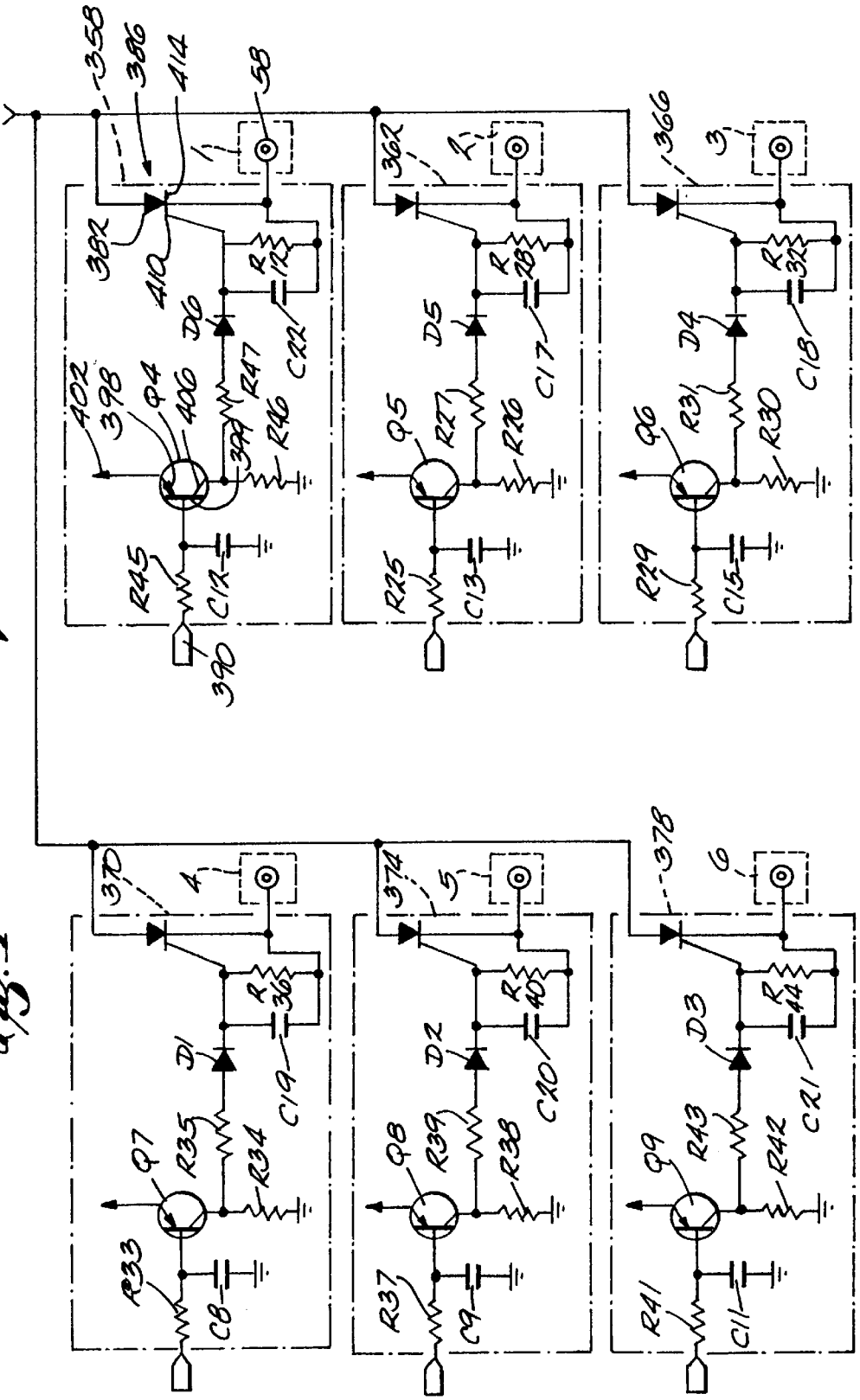
FIG. 7 is a detailed schematic of the ignition distribution circuit of the ignition system.

In general terms, the ignition system 62 includes an electronic control unit (ECU) 66, an input/logic multiplexer 70 (shown in detail in FIG. 4), a direct-current-to-direct-current (DC—DC) converter 74 shown in detail in FIG. 5), an ignition trigger circuit 78 (shown in detail in FIG. 6), a silicon controlled rectifier (SCR) 82, and an ignition distribution circuit 86 (shown in detail in FIG. 7).

Any ECU for an internal combustion engine could be used to operate the ignition system 62. The ECU 66 generates an ignition control signal for each of the cylinders of the engine. In the embodiment of the engine shown in the drawings, the engine is a six-cylinder engine and, accordingly, the ECU 66 generates six ignition control signals, i.e., one ignition control signal per engine cycle for each of the six cylinders. Spark ignition timing is controlled by any suitable arrangement included in the electronic control unit 66.

FIG. 4 illustrates the input/logic multiplexer 70 of the ignition system 62. As shown in FIG. 4, the ignition control signals from the ECU 66 (for cylinders one through six) are input to the input/logic multiplexer 70 on input lines 90, 94, 98, 102, 106, and 110. The input lines 90, 94, 98, 102, 106, and 110 are connected to inverters 114, 118, 122, 126, 130, and 134, respectively. The inverters 114, 118, 122, 126, 130, and 134 have outputs 138, 142, 146, 150, 154, and 158, respectively. The outputs 138, 142, and 146 are connected to OR gate 162 and the outputs 150, 154, and 158 are connect to OR gate 166. The outputs 170 and 174 of the OR gates 162 and 166, respectively, are connected to OR gate 178 and to OR gate 182. The input/logic multiplexer 70 also includes a delay circuit 190 connected to the output 194 of OR gate 178. The delay circuit 190 includes resistor R24, diode D10, capacitor C1, and resistor R1. The output of the delay circuit is connected to the input of OR gate 182 to completely combine or multiplex the ignition control signals from the ECU 66. The output of OR gate 182 is connected to NAND gate 186.

FIG. 5 illustrates the DC—DC converter 74 of the ignition system 62. The DC—DC converter 74 includes a pulse-width modulator 206. The pulse-width modulator 206 is a conventional component that is commercially available from a number of manufacturers. In the preferred embodiment, the pulse-width modulator 206 is manufactured by National Semiconductor, Inc. and is marketed under part number LM2578. As shown in FIG. 5, the output 198 of NAND gate 186 is connected via node B to the oscillating input 202 (pin 3 of the LM2578 chip package) of pulse-width modulator 206 through an RC circuit comprising resistors R2, R14, and R15, capacitors C6 and C7, and a diode D11. The pulse-width modulator 206 also includes an inverted input 208 (pin 1 of the LM2578 chip package). In the preferred embodiment, pins 5 and 7 of the LM2578 chip package are connected to ground. The pulse-width modulator 206 also has an output 210 (pin 6 of the LM2578 chip package) that is connected to a parallel connected bank of insulated gate bipolar transistors (IGBTs) Q1, Q2, and Q3, through NAND gate 214, and through a resistive network including resistors R13, R53, R17, and diode D18.

As shown in the drawings, the IGBTs Q1, Q2, and Q3 include gates 218, 222, and 226, drains 230, 234, and 238, and sources 242, 246, and 250, respectively. The gates 218, 222, and 226 are connected through the resistive network) to the output of the NAND gate 214, and the drains 230, 234, and 238 are connected through resistors R20, R21, and R22, respectively, to one end 254 of the primary winding 258 of a matrix transformer 262. The sources 242, 246, and 250 are connected to ground via serially connected resistors R11 and R10, and are also connected to the inverted input 208 of pulse-width modulator 206.

The opposite end 264 of the primary winding 258 is connected to a voltage source +V. In the preferred embodiment of the invention, the voltage source +V is the output of the internal combustion engine alternator (not shown). The matrix transformer 262 also includes a secondary winding 266 connected at one end 270 to ground and at the opposite end 274 to diode D9 and ignition capacitor C10 through diode D8. The ignition capacitor C10 is connected to the anode 278 of the SCR 82. In the preferred embodiment, the transformer is a 1:2 step up matrix transformer. Matrix transformers are well known in the art and are illustrated and described in U.S. Pat. Nos. 4,665,357 and 4,845,606, which are incorporated herein by reference.

FIG. 6 illustrates the ignition trigger circuit 78 of the ignition system 62. The ignition trigger circuit 78 includes an OR gate 282 having inputs 286 and 290 connected to the output of OR gate 178 via node A. The output 294 of the OR gate 282 is connected through an RC circuit including capacitor C28 and resistor R16 to a first input 298 of OR gate 302. The second input 306 of the OR gate 302 is connected to the output 210 of the pulse-width modulator 206 through OR gate 310, an RC circuit including capacitor C29 and resistor R48, NAND gate 314 and an RC circuit consisting of resistor R49, capacitor C30 and resistor R50. The output 318 of the OR gate 302 is connected to one input 322 of NAND gate 326. The other input 330 of NAND gate 326 is connected to the output of OR gate 178 from the input/logic multiplexer 70 via node A. The output 334 of the NAND gate 326 is connected through an RC circuit including resistors R52 and R51 and capacitor C31 to the primary winding 338 (FIG. 5 only) of isolation transformer 342 (shown in FIGS. 4 and 5). Secondary winding 346 (FIG. 4 only) of the isolation transformer 342 is connected in parallel to diode D31 and to the triggering gate 350 of the SCR 82. The cathode 354 of the SCR 82 is connected via node D to the ignition distribution circuit 86 of the ignition system 62.

FIG. 7 illustrates the ignition distribution circuit 86 of the ignition system 62. Ignition distribution circuit 86 includes ignition triggering modules 358, 362, 366, 370, 374, and 378, for each of the internal combustion engine cylinders 1, 2, 3, 4, 5, and 6, respectively. Each of the modules is identical and, accordingly, only the module 358 will be described in detail. The cathode 354 of SCR 82 is connected to the anode 382 of SCR 386. The input 390 to the module 358 is connected to the ECU 66 to receive the ECU ignition control signal for cylinder 1. The input 390 is connected to the base 394 of transistor Q4 through the RC circuit which includes resistor R45 and capacitor C12. The transistor Q4 includes an emitter 398 connected to a voltage supply 402 and a collector 406 connected to ground through resistor R46. The collector 406 is also connected to the gate 410 of the SCR 386 through the RC circuit including resistor R47, diode D6, capacitor C22, and resistor R12. The SCR 362 includes a cathode 414 that is connected to capacitor C22 and resistor R12 and to the spark plug 58 in the cylinder 1.

Though other components and arrangements of components are possible, the resistors and capacitors employed in the preferred embodiment have the following values:

R1—510 Kohm, ⅛ watt;
R2–R8, R14, R18, R24—1 Kohm, ⅛ watt;
R10, R11, R20–R22—0.01 ohm, 2 watt;
R12, R28, R32, R36, R40, R44—100 ohm, ⅛ watt;
R13, R53—47 ohm, ¼ watt;
R15, R17—24 ohm, ⅛ watt;
R16—82 Kohm, ⅛ watt;
R19, R26, R30, R34, R38, R42, R46—10 Kohm, ⅛ watt;
R25, R29, R33, R37, R41, R45—3.3 Kohm, ⅛ watt;
R27, R31, R35, R39, R43, R47—56 ohm, ⅛ watt;
R48—249 Kohm, ⅛ watt;
R49—5.1 Kohm, ⅛ watt;
R50—750 Kohm;
R51, R52—150 ohm, ⅛ watt;
C1, C28–C30—0.001 microfarad;
C2, C4, C5—100 picofarad;
C3—330 microfarad;
C6—4700 picofarad;
C7, C8, C9, C11–C13, C15—0.022 microfarad;
C10—0.68 microfarad;
C14, C17–C24, C31–C36—0.1 microfarad;
C16, C25—100 microfarad.

The selection of the particular gates, diodes, SCRs, transistors, and other components (employed in the ignition system 62) is within the realm of one of ordinary skill in the art.

In operation, the inputs 90, 94, 98, 102, 106, and 110 are normally at a high voltage level (typically five volts and referred to variously as "high" or "logical '1'"). In order to generate an ignition control signal at a particular input 90, 94, 98, 102, 106, or 110, the ECU 66 "pulls" the input to a low voltage level (typically zero volts and referred to variously as "low" or "logical '1'"). The inputs 90, 94, 98, 102, 106, and 110 are inverted by inverters, respectively, and the outputs of the inverts are "combined" or multiplexed by OR gates 162, 166, 178, and 183 and are buffered by NAND gate 186 for inputting to the DC—DC converter 74. The output of the OR gate 178 is also input to the ignition trigger circuit 78 and to OR gate 182 through delay circuit 190. The delay circuit 190 creates a time delay that allows the pulse-width modulator 206 to continue to run even after the ignition control signal attributable to the previous cycle returns to the high condition. This assures that the ignition capacitor C10 remains charged for the beginning of the current cycle, i.e., when the next ignition control signal from the ECU 66 "goes low".

In response to the output of the input/logic multiplexer 70 (from NAND gate 186) the pulse-width modulator 206 generates, on output 210, an oscillating signal having a frequency of approximately 3500 hertz (Hz). The oscillating signal drives transistors Q1, Q2, and Q3 at the 3500 Hz frequency causing current from the alternator to flow through the primary winding 258 of the matrix transformer 262.

The rapid switching of the current through the matrix transformer 262 generates a flyback voltage that is multiplied and transmitted, through mutual inductance of the matrix transformer 262, to the secondary winding 266 of the matrix transformer 262. The voltage appearing at the secondary winding 266 is approximately 200 to 300 volts. This voltage is stored momentarily by the ignition capacitor C10 until the ignition capacitor C10 is discharged by triggering of SCR 82.

The current flow through the primary winding 258 of matrix transformer 262 is monitored by placing current sensing resistors R10 and R11 in the current flow path and inputting the voltage across the resistors R10 and R11 to the inverted input 208 of pulse-width modulator 206. The pulse-width of the pulse-width modulator output 210 is changed or modulated in response to this voltage so that the ignition system 62 is effective through a wide range of alternator voltages, i.e., in the preferred embodiment, the effective voltage range is approximately 8 volts to approximately 30 volts. In effect, at low alternator voltages, the pulse width of the output 210 of the pulse-width modulator 206 is increased to assure sufficient charge voltage for the ignition capacitor. As the alternator voltage rises, the pulse width of the output 210 of the pulse-width modulator 206 decreases. At the beginning of a cycle, the initial trigger for the SCR 82 is generated by the ignition trigger circuit 78 because there is no output 210 from the pulse-width modulator 206 to trigger the SCR 82. After the initial triggering event, the pulse-width modulator output 210, which is connected to the SCR 82 through the ignition trigger circuit 78, is used to trigger the discharge of the ignition capacitor C10.

The ignition control signals from the ECU 66 are input to the appropriate ignition distribution modules of the ignition distribution circuit 86. When a particular ignition control signal is generated by the ECU 66, the ignition control signal triggers the SCR of the respective ignition distribution module and that SCR is "held" open until the ignition control signal is turned OFF by the ECU 66. As long as the ignition distribution module SCR is held open, the energy discharged from the ignition capacitor C10 is transmitted directly to the ignition coil 59 (in FIG. 2) or spark plug 58 (FIG. 1) connected to that ignition distribution module.

The ignition system is capable of generating a varying number of ignition sparks at the spark plug to increase or decrease the total spark duration according to various engine operating conditions such as engine speed, engine load, throttle position, etc. Though various combinations of desired total spark duration as a function of engine operating conditions are appropriate depending upon the circumstances, the desired total spark duration of the preferred embodiment can be determined as a function of both the engine speed and the throttle position. Moreover, while the invention has been described in terms of generating a higher number of sparks under stratified engine operating conditions, the higher energy level could also be provided under stratified engine operating conditions in the form of a longer spark duration or a higher spark voltage or a combination of longer spark duration, higher spark voltage and higher number of sparks.

Figure 8:
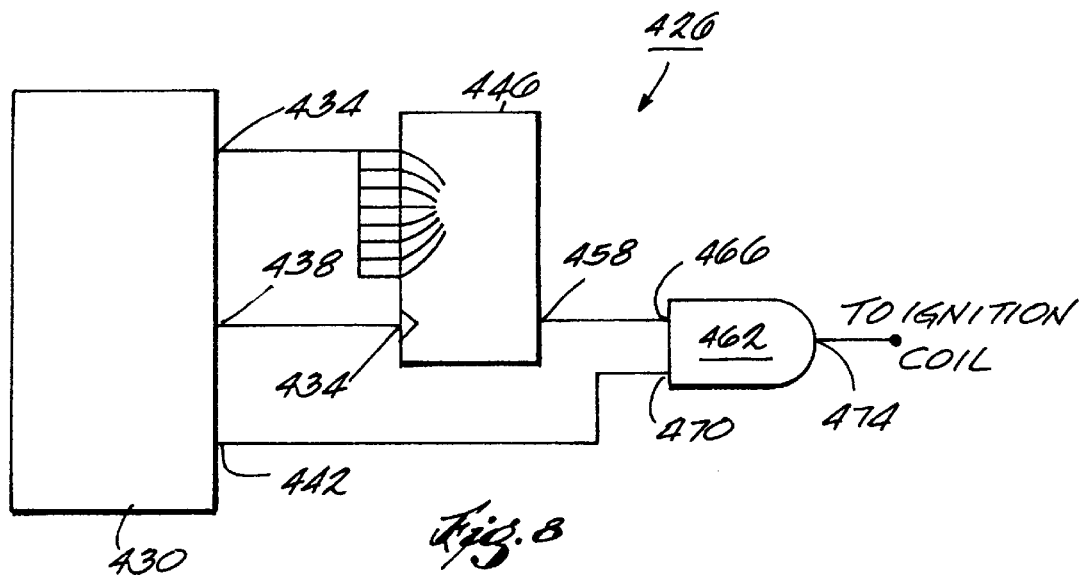
FIG. 8 is an electrical schematic of the time delay ignition circuit for the internal combustion engine included in the marine propulsion device shown in FIG. 1.

The internal combustion engine 10 also includes (see FIG. 8) a time delay ignition circuit 426 for generating a spark in the cylinder 7 at a predetermined moment after the injection of fuel into the combustion chamber 54 has occurred. As shown in FIG. 8, the time delay ignition circuit 426 includes a microprocessor 430 having data outputs 434, an injection indicator output 438, and a spark generating output 442. As described below, the microprocessor 430 generates spark signals at the output 442. It should be understood however, that the spark signals may be generated by another appropriate component such as an ECU. The circuit 426 also includes a timer 446 having an 8-bit register of data inputs 450 for receiving timing information from the data outputs 434 of the microprocessor 430. The timer 446 also has a trigger input 454 connected to the injection indicator output 438 of the microprocessor 430 to receive from the microprocessor 430 a signal indicating when an injection event has been initiated by the microprocessor 430. The timer 446 also includes a timing pulse output 458.

The time delay ignition circuit 426 also includes an AND gate 462 having two inputs 466 and 470 and an output 474. Input 466 of AND gate 462 is connected to the output 458 of the timer 446. Input 470 of AND gate 462 is connected to the microprocessor 430 to receive from the microprocessor 430 a spark generating signal from spark generating output 442. The output 474 of the AND gate 462 is connected to an ignition coil 59 (shown schematically in FIG. 2) to generate a spark in the cylinder 7 and ignite the fuel in the cylinder 7.

Figure 9:
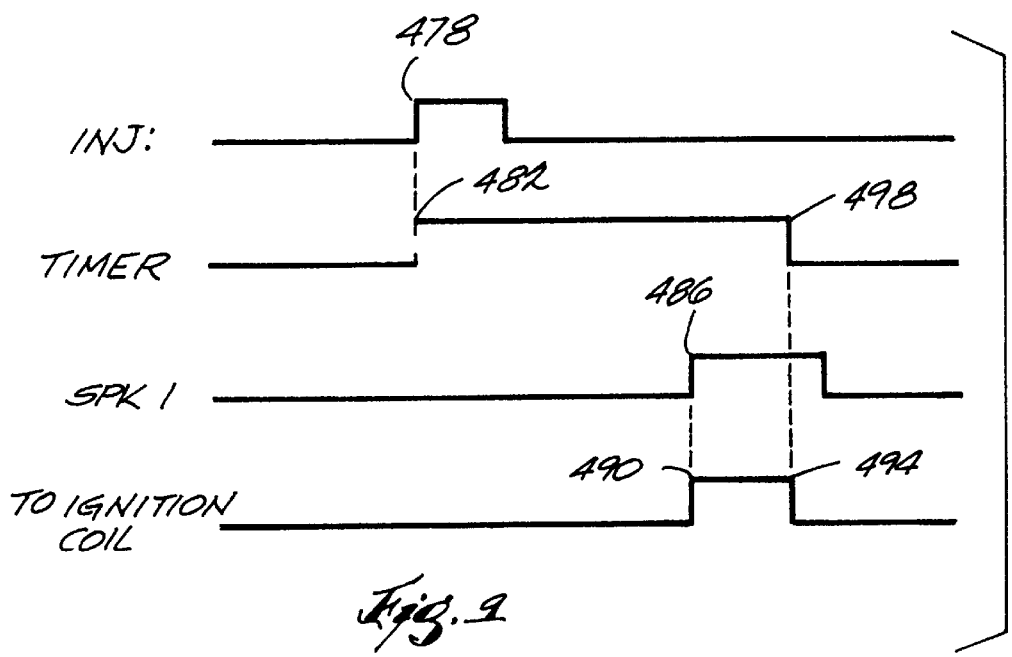
FIG. 9 is a time chart illustrating the time-based relationships between various electronic signals in the time delay ignition circuit.

In operation, when an injection event occurs, the timer 446 receives, from output 438 of microprocessor 430, an injection control signal (see reference numeral 478 in FIG. 9) at the trigger input 454 of timer 446 and, in response to the injection control signal, begins to count the clock pulses from the microprocessor clock signal. As long as the timer count has not expired, the timer 446 generates at the output 458 a high signal or timing signal (see reference numeral 482 in FIG. 9). When the microprocessor 430 generates the spark signal at the output 442 (see reference numeral 486 in FIG. 9), and this spark signal is received at the input 470 to the AND gate 462, the AND gate 462 generates at output 474 an output or ignition signal or current which is transmitted to the ignition coil 59 (see reference numeral 490 in FIG. 9). The output 474 goes low (see reference numeral 494 in FIG. 9) when the output 458 goes low (see reference numeral 498 in FIG. 9). While the output 474 is high, current flowing through the ignition coil rises. The output 458 goes low when the timer count received from the microprocessor has expired, causing the output 474 to go low, i.e., when the microprocessor 430 indicates that the desired amount of time has elapsed since the injection event. Because the current in an inductor or ignition coil cannot change instantaneously ($V=L(di/dt)$), the abrupt change in the current supply to the ignition coil causes the voltage on the ignition coil to quickly rise thereby generating a spark causing ignition of the fuel in the cylinder 7. In order to accommodate various sized engines having various numbers of cylinders, the time delay ignition circuit 426 of FIG. 8 can be repeated as many times as there are cylinders.

While the ignition circuit 426 may be used at any speed, the ignition circuit 426 is preferably used at low or idle speeds, i.e., speeds of 200 to 2000 crankshaft rotations per minute (RPM), and has been shown to operate particularly well at speeds as low as 200 RPM. At speeds above 2000 RPM, the engine is preferably controlled using a conventional crank shaft angle-based ignition system. In both conventional internal combustion engines and the internal combustion engine 10 shown in the drawings, timing of the spark generating signal at such speeds is based solely on the crank angle of the crankshaft. However, in the prior art, the spark generating signal is connected directly to the ignition coil and initiates the ignition spark directly and without the need for any additional signals. The result is that the timing of prior art ignition events is dependent upon crank angle rather than upon absolute time calculated from a fixed point in time. In contrast, the ignition circuit 426 causes ignition to always occur a predetermined amount of time after the injection event occurs, and this predetermined amount of time is not based on the crank angle of the crankshaft. The fuel injection event is the generation of the fuel injection signal at output 442 of microprocessor 430. This may occur either at energization of the fuel injector or upon actual injection of the fuel into the cylinder 7.

Figure 10:
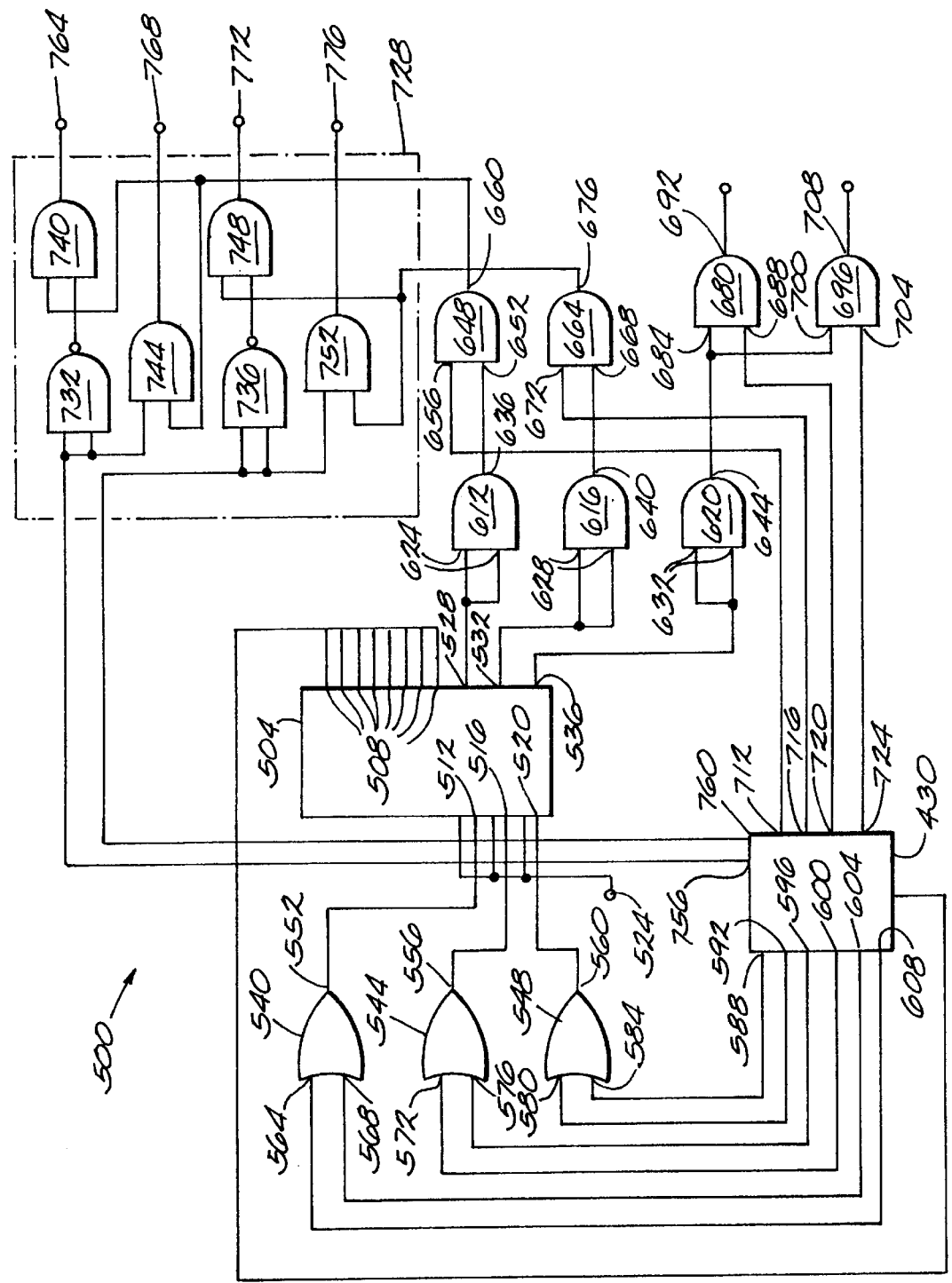
FIG. 10 is an electrical schematic illustrating a time delay ignition circuit for use in connection with an internal combustion engine having six cylinders.

FIG. 10 illustrates a time delay ignition circuit 200 for a six-cylinder engine. Like parts are identified using like reference numerals. Rather than repeating the circuit 426 of FIG. 8 six times, the embodiment illustrated in FIG. 10 combines (multiplexes) various signals to achieve some economy in the use of electronic components.

As shown in FIG. 10, the circuit 500 includes a timer 504 having an eight-bit data input register 508, three trigger inputs 512, 516, and 520 corresponding to cylinders one and four, two and five, and three and six, respectively, a clock input 524, and three outputs 528, 532, and 536 corresponding to trigger inputs 512, 516, and 520, respectively. The circuit 500 also includes OR gates 540, 544, and 548 having outputs 552, 556, and 560, respectively, which are connected to trigger inputs 512, 516, and 520, respectively. OR gates 540, 544, and 548 also include inputs 564 and 568, 572 and 576, and 580 and 584, respectively, connected to the microprocessor 430 to receive injection output signals indicating that an injection event has occurred in a given cylinder. That is, the microprocessor generates output signals at outputs 588, 592, 596, 600, 604, and 608 to indicate that injection has occurred in cylinders one, four, two, five, three, and six, respectively.

The time delay ignition circuit 500 also includes AND gates 612, 616, and 620 having respective pairs of inputs 624, 628, and 632 connected to timer outputs 528, 532, and 536, respectively, and having respective outputs 636, 640, and 644. The time delay ignition circuit 500 also includes AND gate 648 having an input 652 connected to the output 636 of AND gate 612, an input 656 and an output 660; AND gate 664 having an input 668 connected to the output 640 of AND gate 616, an input 672 and an output 676; AND gate 680 having an input 684 connected to the output 644 of AND gate 620, an input 688 and an output 692; and AND gate 696 having an input 700 connected to the output 644 of AND gate 620, an input 704 and an output 708. Inputs 656 and 672 of AND gates 648 and 664, respectively, are connected to the microprocessor 430 to receive the spark signals from outputs 712 and 716, respectively, of microprocessor 430. In time delay ignition circuit 500, the spark signals from the microprocessor for cylinders one and four are multiplexed, i.e., combined, on output 712 and the spark signals for cylinders two and five are multiplexed on output 716. Inputs 688 and 704 of AND gates 680 and 696, respectively, are connected to the microprocessor 430 to receive the spark signals from outputs 720 and 724, respectively, of microprocessor 430. Output 720 generates the spark signal for cylinder three while output 724 generates the spark signal for cylinder six. The outputs 692 and 708 of AND gates 680 and 696, respectively, provide the ignition control signals for ignition coils of cylinders three and six, respectively. Alternatively, the ignition control signals for cylinders three and six could be generated by the microprocessor 430 in multiplexed form and combined along with the combined timing output signal at 644 and demultiplexed by a circuit similar to DMUX 728. The outputs 660 and 676 of AND gates 648 and 664, respectively, provide the multiplexed ignition control signals for ignition coils of cylinders one and four and cylinders two and five, respectively.

The time delay ignition control circuit 500 also includes a demultiplexer (DMUX) 728. The DMUX 728 includes AND gates 732 and 736 and AND gates 740, 744, 748, and 752. DMUX 728 receives, as inputs, the outputs 660 and 676 of AND gates 648 and 664, respectively, and control outputs 756 and 760 of microprocessor 430 to demultiplex the multiplexed ignition control signals for cylinders one and four and two and five that are generated at outputs 660 and 676, respectively. DMUX generates the demultiplexed ignition control signals at outputs 764, 768, 772, and 776 for cylinders one, four, two, and five, respectively.

In operation, the time delay ignition circuit 500 is used at low speeds, i.e., speeds of 200 to 2000 crankshaft rotations per minute (RPM), and has been shown to operate particularly well at speeds as low as 200 RPM. At speeds above 2000 RPM the ignition is preferably controlled using a conventional crank shaft angle-based timing system. The microprocessor supplies an injection signal for cylinder one at input 564 of OR gate 540 and for cylinder four at input 568 of OR gate 540. Thus the injection signals for cylinders one and four are combined at the output 552 of the OR gate 540. Likewise, the injection signals for cylinders two and five are combined at the output 556 of OR gate 544 and the injection signals for cylinders three and six are combined at the output 560 of OR gate 548. The injection signals are input to timer trigger inputs 512, 516, and 520, respectively. Based on multiplexed timing data received from the microprocessor via data inputs 508, a combined timing signal is generated for cylinders one and four at output 528, for cylinders two and five at output 532, and for cylinders three and six at output 536. The combined timing signals are combined with combined spark control signals for cylinders one and four, and cylinders two and five, respectively, to create a pair of combined ignition signals for cylinders one and four, and two and five. DMUX 728 demultiplexes the combined ignition signals to generate an absolute time-based ignition signal for cylinders one, four, two, and five.

The microprocessor also generates separate spark control signals for cylinders three and six at microprocessor outputs 720 and 724, respectively. The spark control signals are input to AND gates 680 and 696 to generate absolute time-based ignition signals for cylinders three and six at outputs 692 and 708, respectively.

While the embodiment described above changes between time-based ignition and crank-angle-based ignition on the basis of engine speed only, one or more of a variety of other engine parameters may be used, either alone or in combination, to determine when to switch between time-based ignition and crank-angle-based ignition. Examples of other appropriate engine parameters include engine load, throttle position, or some other appropriate parameter. Also the circuit 500 can be employed in conjunction with the ignition system 62 to provide a multiple spark, absolute time-based ignition circuit for an internal combustion engine. For example, the outputs 692, 708, 764, 768, 772, and 776 of circuit 500 could be connected to control the inputs 90, 94, 98, 102, 106, and 110, respectively, of the ignition system 62.

FIGS. 11–15 illustrate, in chart form the injection timing, ignition timing, absolute maximum ignition coil ON-time, preferred ignition coil ON-time and injection pulse time of a control scheme for the ignition circuit 500 coupled with the ignition system 62. As shown in FIGS. 11–15, the engine operates with time-based ignition at a low percentage of wide-open throttle (approximately 15% of wide-open throttle or below) and with crank-angle-based ignition at a high percentage of wide-open throttle (above approximately 15% of wide-open throttle). That is, the change from time-based ignition to crank-angle-based ignition is based solely on the throttle position measured as a percentage of wide-open throttle.

The injection timing shown in FIG. 11 is measured in degrees before top-dead-center. When the ignition circuit 500 is operating in the time-based mode, i.e, the throttle position is 150 or less, the injection timing numbers in FIG. 11 represent the number of degrees before top-dead-center that the current begins to flow in the fuel injector coil. When the ignition circuit 500 is operating in the crank-angle-based mode, i.e., the throttle position is greater than 150, the injection timing numbers in FIG. 11 represent the number of degrees before top-dead-center that fuel spray into the combustion chamber begins.

Figure 16:
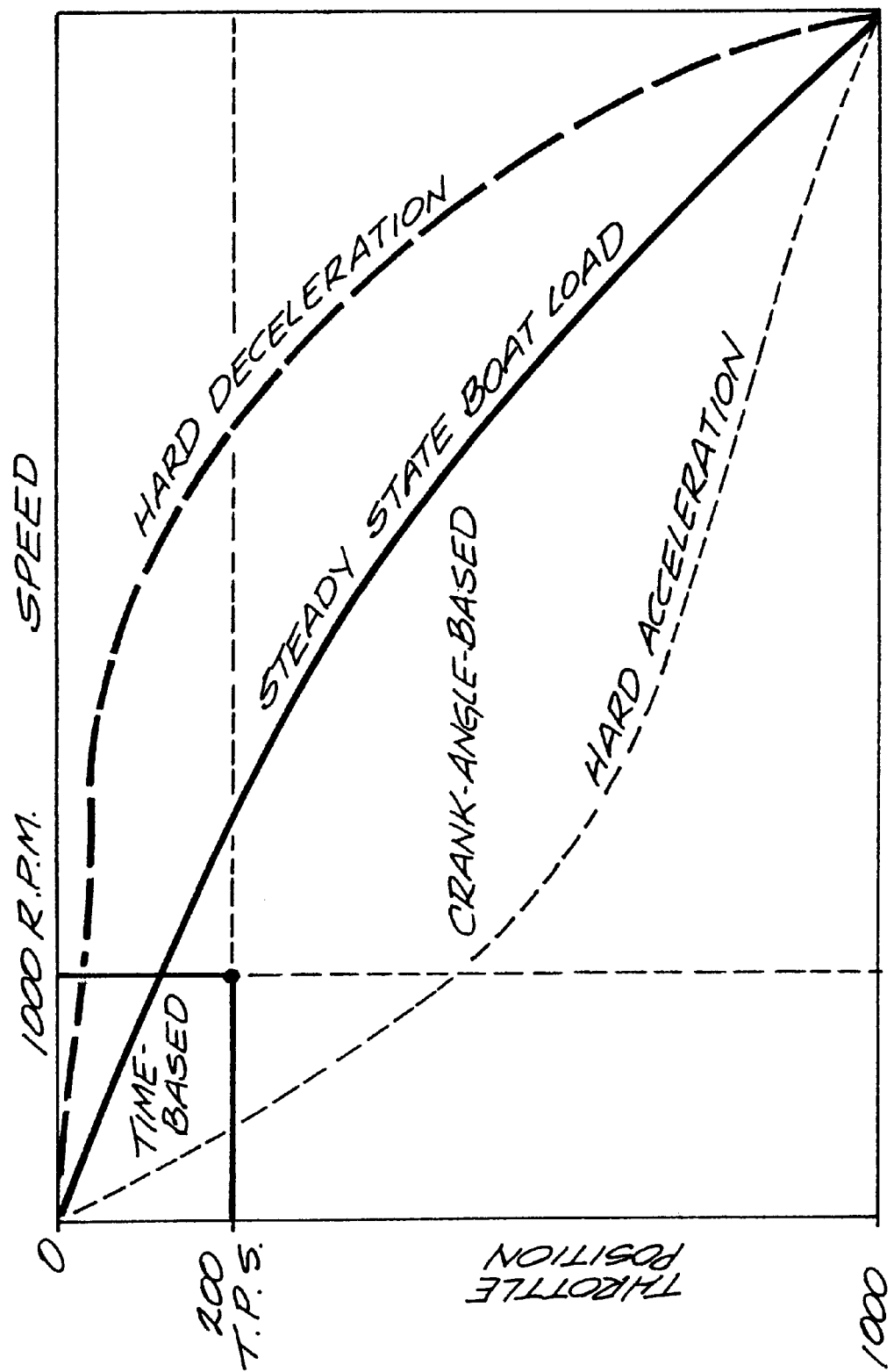
FIG. 16 is a graph showing the transition from time-based ignition to crank-angle-based ignition in the engine of FIG. 10.

FIG. 16 illustrates graphically the change between time-based ignition and crank-angle-based ignition for another alternative control scheme for the ignition circuit 500. As shown in FIG. 16, the engine operates with time-based ignition at a low percentage of throttle position and at low speed, and operates with crank-angle-based ignition at either a high percentage of throttle position or at high speeds. As shown in FIG. 16, ignition is time-based if engine speed is below 1000 RPM and operator throttle demand is less than twenty percent (i.e., the throttle position sensor detects a throttle position less than twenty percent of maximum—shown as "200 T.P.S." in FIG. 16). If engine speed is above 1000 RPM or operator throttle demand is greater than twenty percent, ignition is crank-angle-based. This is controlled by the ECU, as described above. It has been found that this "dual strategy" of transition from time-based ignition to crank-angle-based ignition provides good running quality in an outboard motor by crossing over by engine speed and provides good acceleration characteristics by crossing over by throttle position. The preferred ignition system is disclosed in U.S. Ser. No. 60/020,033, filed Jun. 21, 1996, and titled "Multiple Spark Capacitive Discharge Ignition System for an Internal Combustion Engine", which is incorporated herein by reference.

In one embodiment of a method in accordance with the invention, the liquid fuel contains less than about one percent of lubricating oil.

The two-stroke, spark-ignited, internal combustion engine 10 disclosed herein (including the cylinder 7 which partially defines the combustion chamber 54 and has therein the piston 42 moveable between top-dead-center and bottom-dead-center positions, and the single, solenoid-operated, combined fuel pump and nozzle assembly 60 which is associated with each cylinder 7 and which communicates with the applicable combustion chamber 54) is operable, in one embodiment, in a method comprising the step of supplying air essentially unmixed with fuel to the combustion chamber 54 for pressurization incident to piston advance toward top-dead-center position, supplying liquid fuel under low pressure and essentially unmixed with air to the combined fuel pump and nozzle assembly 60, operating the combined fuel pump and nozzle assembly 60, during low engine speed, to deliver fuel essentially unmixed with air directly into the combustion chamber 54 at a pressure substantially above the low fuel pressure and higher than the air pressure in the combustion chamber occurring in response to air pressurization incident to piston advance toward top-dead-center, so as to thereby obtain a finely atomized stratified charge in the combustion chamber, igniting the fuel, during low engine speed, at a given spark energy level and at a first timing spaced before top-dead-center position, operating the combined fuel pump and nozzle assembly, during high engine speed, to deliver fuel essentially unmixed with air directly into the combustion chamber 54 at a pressure substantially above the low fuel pressure and higher than the air pressure in the combustion chamber occurring in response to air pressurization incident to piston advance toward top-dead-center, so as thereby to obtain a homogeneous charge in the combustion chamber, and igniting the fuel, during high engine speed, at a lesser spark energy level than the given spark energy level and at a second timing spaced before top-dead-center position at a greater spacing than the first timing.

Increased or greater spark energy level, as used in the above-described method, refers to one or more of increased spark potential, increased spark duration, and increased occurrence of discrete sparks per cycle. Preferably, two-spark occurrences per ignition cycle are employed for high engine speed operation and between ten and fifteen spark occurrences per ignition cycle are employed for low engine speed operation.

Another embodiment of a method in accordance with the invention involves the steps of supplying air essentially unmixed with fuel to the combustion chamber for pressurization incident to piston advance toward top-dead-center position, supplying liquid fuel under low pressure and essentially unmixed with air to the combined fuel pump and nozzle assembly, operating the combined fuel pump and nozzle assembly, during low engine speed, to deliver fuel essentially unmixed with air directly into the combustion chamber at a pressure substantially above the low fuel pressure and higher than the air pressure in the combustion chamber occurring in response to air pressurization incident to piston advance toward top-dead-center, so as thereby to obtain a finely atomized stratified charge in the combustion chamber, igniting the fuel, during low engine speed, at a given spark energy level and at a timing based on a time interval after fuel injection, operating the combined fuel pump and nozzle assembly, during high engine speed, to deliver fuel essentially unmixed with air directly into the combustion chamber at a pressure substantially above the low fuel pressure and higher than the air pressure in the combustion chamber occurring in response to air pressurization incident to piston advance toward top-dead-center, so as thereby to obtain a homogeneous charge in the combustion chamber, and igniting the fuel, during high engine speed, at a lesser spark energy level than the given spark energy level and at a timing based on crank angle.

Another embodiment of a method in accordance with the invention involves the steps of supplying air essentially unmixed with fuel to the combustion chamber for pressurization incident to piston advance toward top-dead-center position, supplying liquid fuel under low pressure and essentially unmixed with air to the combined fuel pump and nozzle assembly, operating the combined fuel pump and nozzle assembly, when the engine throttle is set at or below about 15 percent open, to deliver fuel essentially unmixed with air directly into the combustion chamber at a pressure substantially above the low fuel pressure and higher than the air pressure in the combustion chamber occurring in response to air pressurization incident to piston advance toward top-dead-center, so as thereby to obtain a finely atomized stratified charge in the combustion chamber, igniting the fuel when the engine throttle is set at or below about 15 percent open, at a given spark energy level and at a timing based on a time interval after fuel injection, operating the combined fuel pump and nozzle assembly, when the engine throttle is set above about 15 percent open, to deliver fuel essentially unmixed with air directly into the combustion chamber at a pressure substantially above the low fuel pressure and higher than the air pressure in the combustion chamber occurring in response to air pressurization incident to piston advance toward top-dead-center, so as thereby to obtain a homogeneous charge in the combustion chamber, and igniting the fuel, when the engine throttle is set above about 15 percent open, at a lesser spark energy level than the given spark energy level, and at a timing based on the crank angle.

Another embodiment of a method in accordance with the invention involves the steps of supplying air essentially unmixed with fuel to the combustion chamber for pressurization incident to piston advance toward top-dead-center position, supplying liquid fuel under low pressure and essentially unmixed with air to the combined fuel pump and nozzle assembly, operating the combined fuel pump and nozzle assembly, when the engine throttle is set at or below about 15 percent open, to deliver fuel essentially unmixed with air directly into the combustion chamber at a pressure substantially above the low fuel pressure and higher than the air pressure in the combustion chamber occurring in response to air pressurization incident to piston advance toward top-dead-center, so as thereby to obtain a finely atomized stratified charge in the combustion chamber, igniting the fuel, when the engine throttle is set at or below about 15 percent open, at a given spark energy level and at a timing based on a time interval after fuel injection, operating the combined fuel pump and nozzle assembly, when the engine throttle is set between about 15 percent open and 100 percent open, to deliver fuel essentially unmixed with air directly into the combustion chamber at a pressure substantially above the low fuel pressure and higher than the air pressure in the combustion chamber occurring in response to air pressurization incident to piston advance toward top-dead-center, so as thereby to obtain a homogeneous charge in the combustion chamber, and igniting the fuel, when the engine throttle is set between about 15 percent open and 100 percent open, at a lesser spark energy level than the given spark energy level, and at a timing based on the crank angle.

The internal combustion engine 10 disclosed herein is also operable, in one embodiment, in a method comprising the steps of obtaining a two-stroke, spark-ignited, internal combustion engine including a cylinder defining a combustion chamber and having therein a piston moveable between a top-dead-center position and a bottom-dead-center position, which engine also includes a single, solenoid-operated, combined fuel pump and nozzle assembly communicating with the combustion chamber, supplying air essentially unmixed with fuel to the combustion chamber for pressurization incident to piston advance toward top-dead-center position, supplying liquid fuel under low pressure and essentially unmixed with air to the combined fuel pump and nozzle assembly, operating the combined fuel pump and nozzle assembly, during wide-open throttle and at maximum engine speed, to deliver fuel essentially unmixed with air directly into the combustion chamber at a pressure substantially above the low fuel pressure and higher than the air pressure in the combustion chamber occurring in response to air pressurization incident to piston advance toward top-dead-center, and at a small angle to the direction of the cylinder axis commencing when the piston is spaced before top-dead-center position by about 215 degrees and continuing until the piston is spaced before top-dead-center position by about 130 degrees so as thereby to obtain, throughout the combustion chamber, a homogeneous charge of fuel droplets having a relatively large size, igniting the fuel, during wide-open throttle and at maximum engine speed, with one to three spark occurrences commencing when the piston is spaced before top-dead-center position by about 28 degrees and continuing until the piston is spaced before top-dead-center position by about 7 degrees, operating the combined fuel pump and nozzle assembly, during about 5–50 percent open throttle condition and at an engine speed of about 200 RPM, to inject fuel essentially unmixed with air directly into the combustion chamber at a pressure substantially above the low fuel pressure and higher than the air pressure in the combustion chamber occurring in response to air pressurization incident to piston advance toward top-dead-center, and at a small angle to the direction of the cylinder axis commencing when the piston is spaced before top-dead-center position by about 21 degrees and continuing until the piston is spaced before top-dead-center position by about 14 degrees so as thereby to obtain, near the top of the combustion chamber, a stratified charge of finely atomized fuel droplets having a size less than the large size fuel droplets of the homogeneous charge, and igniting the fuel, during about 15 percent open throttle condition and at an engine speed of about 200 RPM, with about ten to fifteen spark occurrences commencing when the piston is spaced before top-dead-center position by about 56.4 degrees and continuing until the piston is spaced before top-dead-center position by about 51.9 degrees.

It is noted that, at throttle positions below about 15 percent, the fuel charge is generally stratified, that, at throttle settings above about 15 percent, the fuel charge begins to be less stratified and more homogenized, and that, at some throttle settings above 15 percent, the fuel charge becomes fully homogenized.

It is also noted that, at throttle positions below about 15 percent, ignition takes place at a given time interval after commencement of fuel injection, and that at throttle positions above about 15 percent ignition timing is crank-angle-based. Other specific degrees of throttle opening could also be employed.

While the disclosure herein, in part, refers to basing the time of ignition on degrees of throttle setting, the time of ignition could also be based solely upon speed, or upon a combination of throttle setting and speed.

In addition, while the disclosure herein, in part, refers to basing the spark intensity or spark energy level on degrees of throttle setting, i.e., on whether the engine is operating at low or high speeds, the spark intensity or spark energy level could also be based solely upon speed, or upon a combination of throttle setting and speed. (It is further noted that both throttle opening and speed can be measured directly from engine operation, but that load is not directly determined from either of speed or throttle setting alone.)

It is also noted that fuel is injected in the above-described methods against the pressure of the air in the combustion chamber and that such air pressure progressively increases to a high level as the piston approaches top-dead-center position.

While the embodiment described above changes between time-based ignition and crank-angle-based ignition on the basis of engine speed only, one or more of a variety of other engine parameters may be used, either alone or in combination, to determine when to switch between time-based ignition and crank-angle-based ignition. Examples of other appropriate engine parameters include engine load, throttle position, or some other appropriate parameter.

The corresponding structures, materials, acts, and equivalents of all means or step plus function elements in the claims below are intended to include any structure, material, or act for performing the function in combination with other claimed elements as specifically claimed.

We claim:

1. A method of operating a two-stroke, spark-ignited, internal combustion engine including a cylinder defining a combustion chamber and having therein a piston moveable by a crankshaft between a top-dead-center position and a bottom-dead-center position, and a single, solenoid-operated, combined fuel pump and nozzle assembly communicating with the combustion chamber, said method comprising the steps of:

supplying air essentially unmixed with fuel to the combustion chamber for pressurization incident to piston advance toward top-dead-center position;

supplying liquid fuel under low pressure and essentially unmixed with air to the combined fuel pump and nozzle assembly;

operating the combined fuel pump and nozzle assembly, during low engine speed, to deliver fuel essentially unmixed with air directly into the combustion chamber at a pressure substantially above the low fuel pressure and at a pressure higher than the pressurized air in the combustion chamber so as to obtain a finely atomized stratified charge in the combustion chamber;

igniting the fuel, during low engine speed, at a given spark energy level and at a predetermined amount of time after the fuel deliver occurs;

operating the combined fuel pump and nozzle assembly, during high engine speed, to deliver fuel essentially unmixed with air directly into the combustion chamber and into air pressurized at a level substantially above the low fuel pressure and at a pressure higher than the pressurized air in the combustion chamber so as to obtain a homogeneous charge in the combustion chamber; and igniting the fuel, during high engine speed, at a spark energy level less than the given spark energy level and at a timing based upon crankshaft angle position.

2. A method of operating a two-stroke, spark-ignited, internal combustion engine including a cylinder defining a combustion chamber and having therein a piston moveable by a crankshaft between a top-dead-center position and a bottom-dead-center position, and a single, solenoid-operated, combined fuel pump and nozzle assembly communicating with the combustion chamber, said method comprising the steps of:

supplying air essentially unmixed with fuel to the combustion chamber for pressurization incident to piston advance toward top-dead-center position;

supplying liquid fuel under low pressure and essentially unmixed with air to the combined fuel pump and nozzle assembly;

operating the combined fuel pump and nozzle assembly, during low engine speed, to deliver fuel essentially unmixed with air directly into the combustion chamber at a level substantially above the low fuel pressure and at a pressure higher than the pressurized air in the combustion chamber so as to obtain a finely atomized stratified charge in the combustion chamber;

igniting the fuel, during low engine speed, at a given spark energy level and at a timing based on a predetermined time interval after fuel delivery;

operating the combined fuel pump and nozzle assembly, during high engine speed, to deliver fuel essentially unmixed with air directly into the combustion chamber at a level substantially above the low fuel pressure and at a pressure higher than the pressurized air in the combustion chamber so as to obtain a homogeneous charge in the combustion chamber; and igniting the fuel, during high engine speed, at a lesser spark energy level than the given spark energy level and at a timing based on crankshaft angle.

3. A method of operating a two-stroke, spark-ignited, internal combustion engine including a cylinder defining a combustion chamber and having therein a piston moveable by a crankshaft between a top-dead-center position and a bottom-dead-center position, and a single, solenoid-operated, combined fuel pump and nozzle assembly communicating with the combustion chamber, said method comprising the steps of:

supplying air essentially unmixed with fuel to the combustion chamber for pressurization incident to piston advance toward top-dead-center position;

supplying liquid fuel under low pressure and essentially unmixed with air to the combined fuel pump and nozzle assembly;

operating the combined fuel pump and nozzle assembly, when the engine throttle is set at or below about 15 percent open, to deliver fuel essentially unmixed with air directly into the combustion chamber at a pressure substantially above the low fuel pressure and at a pressure higher than the pressurized air in the combustion chamber so as to obtain a finely atomized stratified charge in the combustion chamber;

igniting the fuel, when the engine throttle is set at or below about 15 percent open, at a given spark energy level and at a timing based on a predetermined time interval after fuel delivery;

operating the combined fuel pump and nozzle assembly, when the engine throttle is set above about 15 percent open, to deliver fuel essentially unmixed with air directly into the combustion chamber at a pressure substantially above the low fuel pressure and at a pressure higher than the pressurized air in the combustion chamber so as to obtain a homogeneous charge in the combustion chamber; and igniting the fuel, when the engine throttle is set above about 15 percent open, at a lesser spark energy level than the given spark energy level, and at a timing based solely on the crankshaft angle.

4. A method of operating a two-stroke, spark-ignited, internal combustion engine including a cylinder defining a combustion chamber and having therein a piston moveable by a crankshaft between a top-dead-center position and a bottom-dead-center position, and a single, solenoid-operated, combined fuel pump and nozzle assembly communicating with the combustion chamber, said method comprising the steps of:

supplying air essentially unmixed with fuel to the combustion chamber for pressurization incident to piston advance toward top-dead-center position;

supplying liquid fuel under low pressure and essentially unmixed with air to the combined fuel pump and nozzle assembly;

operating the combined fuel pump and nozzle assembly, when the engine throttle is set at or below about 15 percent open, to deliver fuel essentially unmixed with air directly into the combustion chamber at a pressure substantially above the low fuel pressure and at a pressure higher than the pressurized air in the combustion chamber so as to obtain a finely atomized stratified charge in the combustion chamber;

igniting the fuel, when the engine throttle is set at or below about 15 percent open, at a given spark energy level and at a timing based on a predetermined time interval after fuel injection;

operating the combined fuel pump and nozzle assembly, when the engine throttle is set above about 15 percent open and 100 percent open, to deliver fuel essentially unmixed with air directly into the combustion chamber and into air pressurized at a level substantially above the low fuel pressure and at a pressure higher than the pressurized air in the combustion chamber so as to obtain a homogeneous charge in the combustion chamber; and igniting the fuel, when the engine throttle is set between about 15 percent open and 100 percent open, at a lesser spark energy level than the given spark energy level, and at a timing based solely on the crankshaft angle.

5. A method of operating a two-stroke, spark-ignition, internal combustion engine including a cylinder defining a combustion chamber and having therein a piston moveable by a crankshaft to compress a fuel/air mixture, and a solenoid-operated, combined fuel pump and nozzle assembly for injecting fuel into said combustion chamber, said method comprising the steps of:

igniting the fuel in said combustion chamber, during low engine speeds below a first given RPM, at a given spark energy level and at a predetermined amount of time after fuel injection occurs, and igniting the fuel in said combustion chamber, during high engine speeds at or above said first given RPM, at a spark energy level less than the given spark energy level and at a timing based solely on crankshaft angle position.

6. The method of claim 6 further including the steps of:

igniting said fuel according to said predetermined amount of time after the occurrence of fuel injection during low engine speeds below about 2000 RPM; and igniting said fuel, based solely upon crankshaft angle position, during high engine speeds of about 2000 RPM and above.

7. A method of operating a two-stroke, spark-ignition, internal combustion engine including a cylinder defining a combustion chamber comprising the steps of:

providing a throttle having a position moveable between an idle position and a wide-open position for maximum engine RPM;

using spark ignition based upon generation of spark energy a predetermined amount of time after fuel injection at low engine speeds below a first predetermined RPM and below a first throttle position between said idle position and said wide-open position;

using spark ignition based upon generation of spark energy at predetermined crankshaft angular position at either a high engine speed equal to or greater than said first predetermined RPM or a throttle position equal to or greater than said first throttle position.

8. The method of claim 7 wherein:

said first predetermined RPM is 1000 RPM; and said first throttle position is 20% of said wide-open position.

9. A method of operating a two-stroke, spark-ignition, internal combustion engine including a cylinder defining a combustion chamber comprising the steps of:

providing a throttle having a position moveable between an idle position and a wide-open position for maximum engine RPM;

using spark ignition based upon generation of spark energy a predetermined amount of time after fuel injection at throttle positions of 15% of the wide-open position or less; and using spark ignition based upon generation of spark energy a predetermined crankshaft angular position at throttle position greater than 15% of the wide-open position.

* * * * *